United States Patent
Kihara

(10) Patent No.: US 7,620,072 B2
(45) Date of Patent: Nov. 17, 2009

(54) DEVICE FOR REPRODUCING RECEIVED DATA FOR RADIO DATA COMMUNICATION AND A METHOD OF ADJUSTING FREQUENCY THEREFOR

(75) Inventor: Takayoshi Kihara, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 1117 days.

(21) Appl. No.: 10/866,045

(22) Filed: Jun. 14, 2004

(65) Prior Publication Data

US 2004/0258185 A1    Dec. 23, 2004

(30) Foreign Application Priority Data

Jun. 17, 2003  (JP) .............................. 2003-172032

(51) Int. Cl.
  *H04J 1/00*  (2006.01)
  *H04L 7/04*  (2006.01)
(52) U.S. Cl. .................. 370/480; 370/516; 375/362
(58) Field of Classification Search ......... 370/480–483, 370/488, 503, 516; 375/362, 363, 371–373, 375/375
See application file for complete search history.

(56) References Cited

U.S. PATENT DOCUMENTS

| 6,157,820 | A  | * | 12/2000 | Sourour et al. | ........... 455/226.2 |
| 6,587,528 | B1 | * | 7/2003  | Wynn | ......................... 375/362 |
| 7,200,195 | B2 | * | 4/2007  | Amano | ....................... 375/355 |
| 2003/0210756 | A1 | * | 11/2003 | Ito | ............................. 375/354 |

FOREIGN PATENT DOCUMENTS

JP        3486186        10/2003

* cited by examiner

*Primary Examiner*—Aung S Moe
*Assistant Examiner*—Kerri M Rose
(74) *Attorney, Agent, or Firm*—Studebaker & Brackett PC; Donald R. Studebaker

(57) ABSTRACT

A receiver arrangement including a received data reproducing device includes an RF (Radio Frequency) receiver configured to determine the signal strength of a received signal and feed it to a clock frequency determining circuit. Number-of-error information, included in the outputs of a clock phase detector and produced during error detection effected with a sync word, a packet header and a payload of a packet field by field, are also fed to the clock frequency determining circuit. The clock frequency determining circuit designates a subject to deal with the packet and selects single clock frequency information out of clock frequencies determined. The clock frequency information thus selected is input to the clock phase detector.

14 Claims, 17 Drawing Sheets

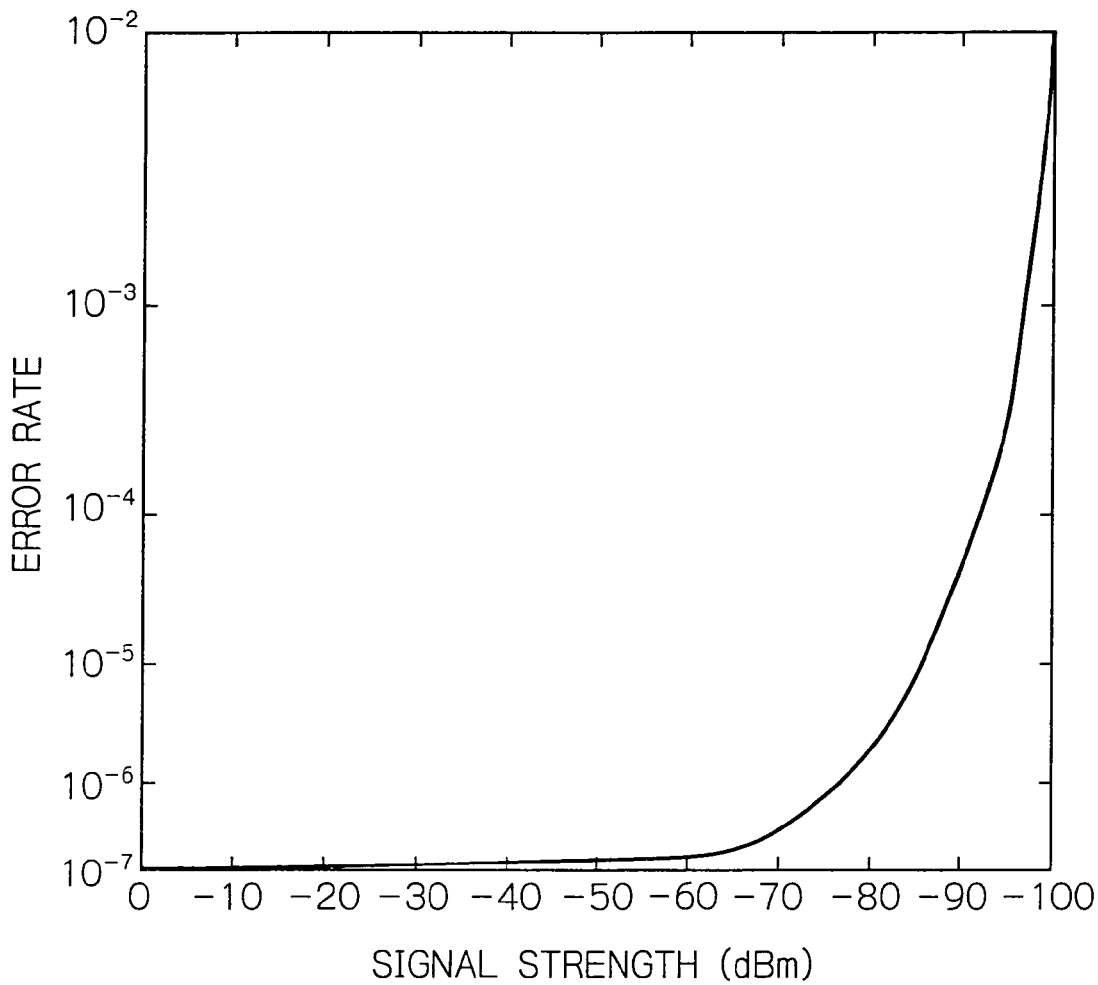

Fig. 13

| | SYNC.WORD ERROR | HEADER ERROR | RANDOM ERROR | PACKET TYPE | PACKET LENGTH |
|---|---|---|---|---|---|
| ERROR INFORMATION OF LAST RECEIVED PACKET | SYNC_ERR [i] | HEADER_ERR [i] | RANDOM_ERR [i] | PKT_TYPE [i] | PAYLOAD_LENGTH [i] |
| ERROR INFORMATION OF BEFORE-LAST RECEIVED PACKET | SYNC_ERR [i-1] | HEADER_ERR [i-1] | RANDOM_ERR [i-1] | PKT_TYPE [i-1] | PAYLOAD_LENGTH [i-1] |
| | ..... | ..... | ..... | ..... | ..... |
| ERROR INFORMATION RECEIVED P TIMES BEFORE | SYNC_ERR [i-P+1] | HEADER_ERR [i-P+1] | RANDOM_ERR [i-P+1] | PKT_TYPE [i-P+1] | PAYLOAD_LENGTH [i-P+1] |

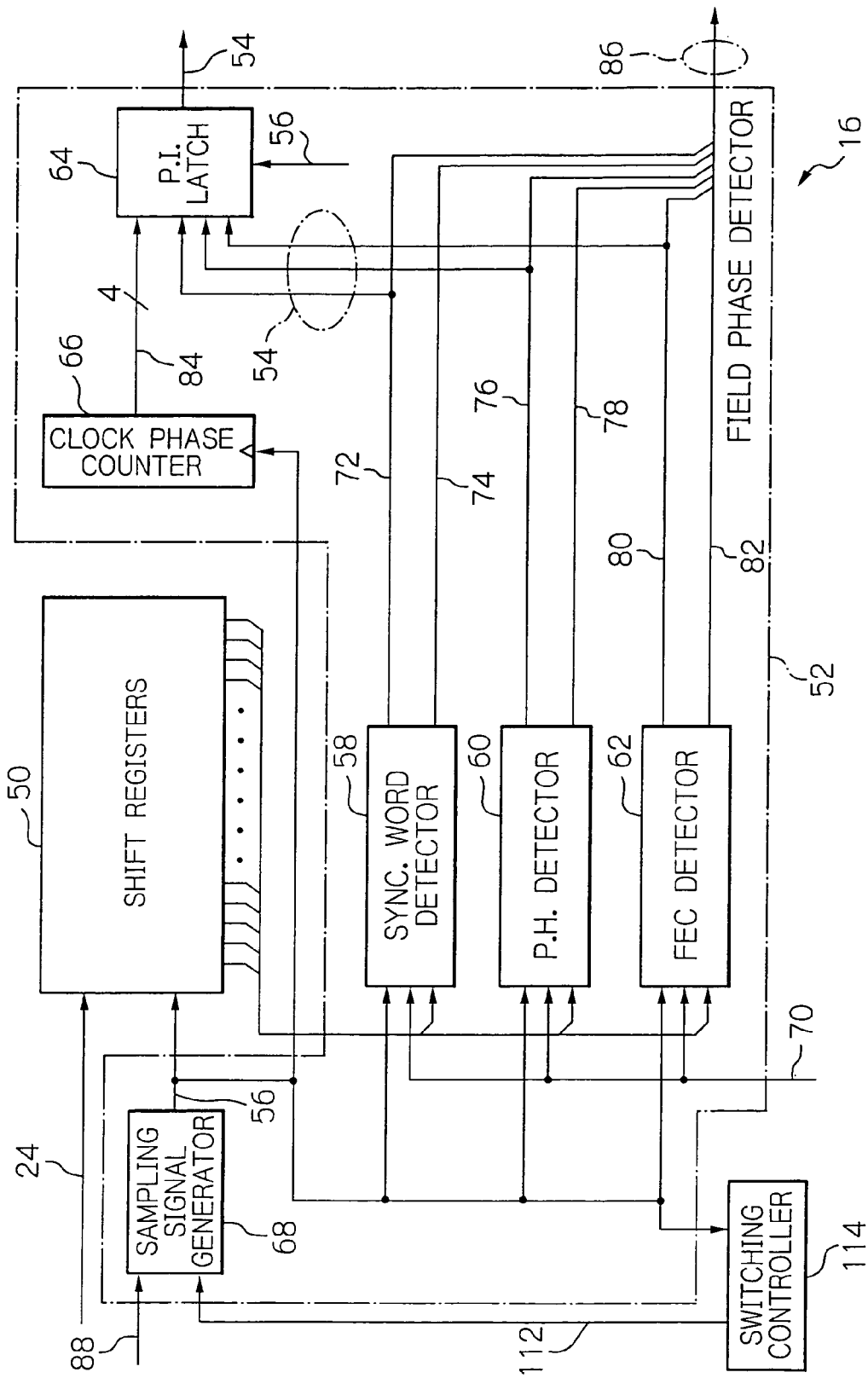

DEVICE FOR REPRODUCING RECEIVED DATA FOR RADIO DATA COMMUNICATION AND A METHOD OF ADJUSTING FREQUENCY THEREFOR

BACKGROUND OF THE INVENTION

1. Field of the Invention

The present invention relates to a device for reproducing received data and a method of adjusting frequency therefor. More particularly, a received data reproducing device in accordance with the present invention is applied to radio data communication and may be implemented as a baseband receiver based on Bluetooth (trade name), which is a specific radio communication standard, or a receiver arrangement configured to receive the baseband signal of serial data by way of example. Also, a frequency adjusting method in accordance with the present invention optimizes a clock frequency used to sample a received baseband signal for thereby producing optimum phase information by sampling.

2. Description of the Background Art

A received data reproducing device of the type using Bluetooth uses a clock higher than the symbol rate of the received data to separate a received sample clock and reproduce received data. With such a clock, the reproducing device detects, among received data, a synchronizing word heading the data and serving as a clue to synchronization and estimates the phase of a point or position where a data value varies, i.e. a data transition point. By using the result of the estimation, the reproducing device separates the clock component of the received data, fixes the phase, and uses the resulting signal as a clock for sampling the received data.

To cope with sharp phase changes and noise that may occur in a packet header and a payload to be received after the sync word, an improved received data reproducing device proposed in the past is configured to detect data transition points and errors in the packet header and payload with a clock rate N times as high as the symbol rate of received data in the same manner as it deals with a sync word. The improved reproducing device can flexibly adapt to varying receipt conditions because it has a clock rate varying function for implementing the N times higher clock. Further, the improved reproducing device is configured to check data for errors, e.g. header errors and an FEC (Forward Error Code) to accurately receive the data, thereby providing the entire received packet with solidness and improved receipt characteristic. It follows that the improved reproducing device saves power at the same time if operated with the lowest, necessary clock rate satisfying the above conditions for the entire received packet.

However, the improved received data reproducing device stated above does not even suggest a function of determining an optimum clock frequency although indicating the adjustment to a clock rate N times as high as the symbol rate of received data. More specifically, although the clock rate adjusting function provides the reproducing device with flexibility, receipt characteristics are dependent on the index used to determine an optimum clock frequency. Stable operation is not achievable with a received data reproducing device if receipt characteristics are dependent on the index.

SUMMARY OF THE INVENTION

It is an object of the present invention to provide a received data reproducing device and a frequency adjusting method therefor capable of calculating an optimum clock frequency to thereby effectively exhibit the adjusting function using the N times higher clock rate.

In accordance with the present invention, a received data reproducing device includes a measuring circuit for measuring the signal strength of a received signal. An optimum phase detecting circuit divides the phase of a frequency particular to the received signal into N (2 or greater integer) to sample the received signal with a sampling signal multiplied in accordance with N, stores a sampled value for each divided phase, outputs optimum clock phase information for the received data derived from error information of each field, which is set in accordance with the communication standard of the received signal, and outputs error presence/absence information obtained in the event of detection of the error information. A frequency determining circuit determines the optimum frequency of the sampling signal on the basis of the signal strength measured, the error presence/absence information output field by field and link information indicative of a station communicating with the received data reproducing device, and feeds the optimum frequency information to the optimum phase detecting circuit. A buffer circuit takes in the received signal and then adjusts the phase of the received signal with the individual clock phase information corrected to read out the received signal.

Also, in accordance with the present invention, a method of adjusting frequency in reproducing received data begins with a step of obtaining particular information relating to, among a plurality of transmitting stations, a subject transmitting station sending a signal to be received, and generating a select signal matching with the subject transmitting station. Subsequently, the signal strength of a received signal received from each transmitting station is determined, and then a first clock frequency corresponding to the signal strength is determined. The received signal is demodulated to determine optimum phase information for each item information, which is attached to the received signal in accordance with the communication standard of the received signal, and then the number of errors having occurred in each item information is calculated to produce number-of-error information item by item. The number-of-error information and information relating to the number-of-error information for each unit of the received unit supplied are stored. Subsequently, each of the number-of-error information and the information relating thereto stored over preselected past units are summed up to produce an average value. The item information and average value are used to determine a second clock frequency. Thereafter, the first and second clock frequencies are compared with each other, and higher one of them is selected as clock frequency information. The clock frequency information thus selected is output in accordance with the select signal.

BRIEF DESCRIPTION OF THE DRAWINGS

The objects and features of the present invention will become more apparent from consideration of the following detailed description taken in conjunction with the accompanying drawings in which:

FIG. 8 is a graph showing a relation between the signal strength of a received signal input to an RF (Radio Frequency) receiver included in the illustrative embodiment and the error rate;

FIG. 9 shows a table, of which the data are stored in the clock frequency determining circuit and listing specific signal strengths and specific clock frequencies in one-to-one correspondence;

FIG. 13 shows a table listing various kinds of error information and packet information stored in the clock frequency determining circuit packet by packet;

FIG. 18 is a schematic block diagram showing a clock phase detecting circuit included in the alternative embodiment shown in FIG. 17.

DESCRIPTION OF THE PREFERRED EMBODIMENTS

Figure 1:
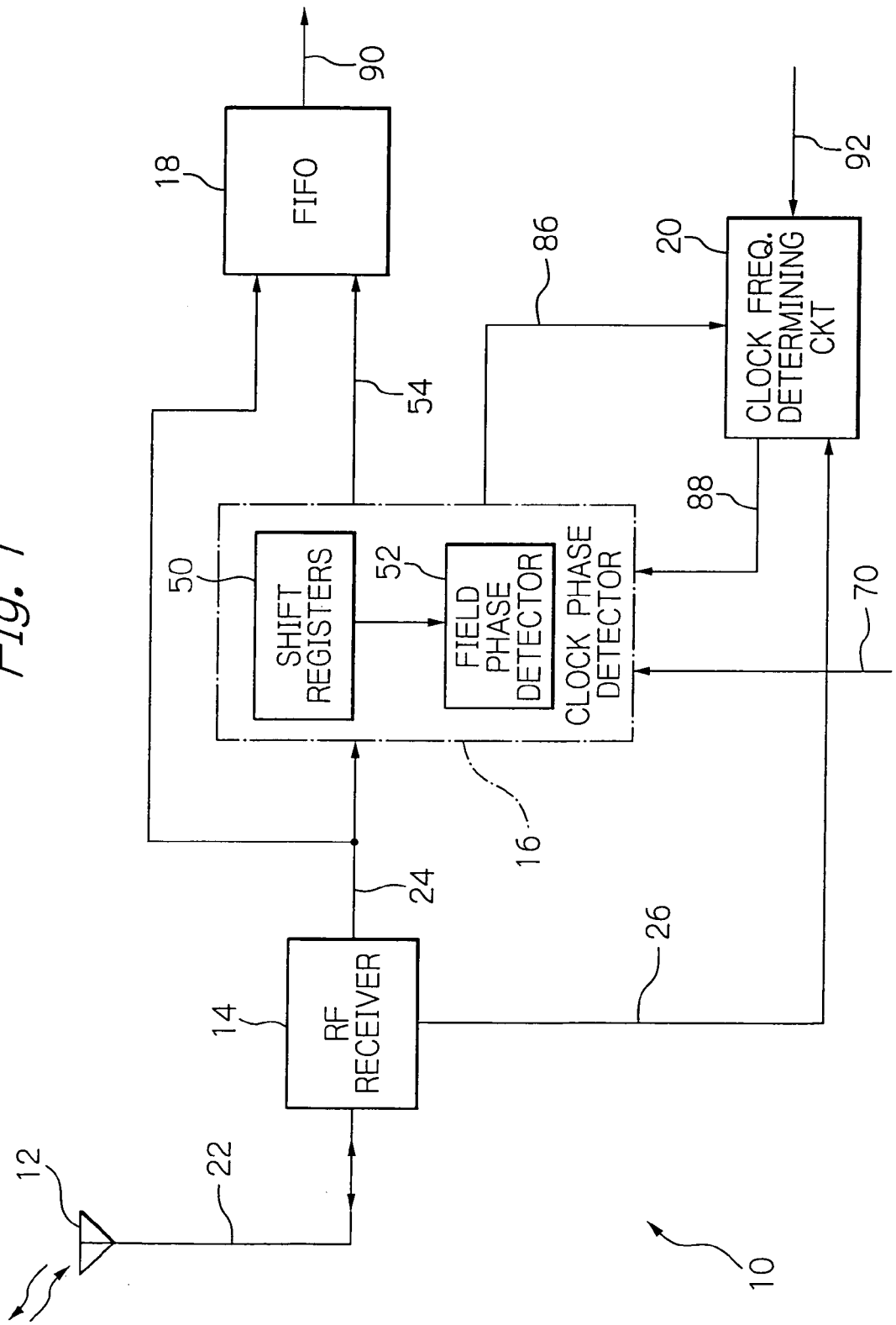
FIG. 1 is a schematic block diagram showing a receiver based on Bluetooth and to which a received data reproducing device embodying the present invention is applied.

Referring to FIG. 1 of the drawings, a receiver arrangement including a received data reproducing device embodying the present invention is configured in accordance with Bluetooth, so that structural parts and elements thereof will be described accordingly. Part of the receiver not directly relevant to the understanding of the present invention is not shown in FIG. 1 nor will be described. Signals are designated by reference numerals attached to connections on which they appear.

As shown in FIG. 1, the receiver arrangement, generally 10, includes an RF antenna 12, an RF receiver 14, a clock phase detector 16, a FIFO (First-In First-Out) circuit 18, and a clock frequency determining circuit 20. Although the receiver arrangement 10 is assumed to have only a receiver function, it may be provided with a transmitter function as well, if desired.

The RF antenna 12 is capable of receiving or transmitting a radio wave lying in the frequency band of 2.4 GHz, which is dealt with by Bluetooth. A radio signal 22 received by the RF antenna 12 is input to the RF receiver 14. The RF receiver 14 is configured to down-convert the 2.4 GHz radio signal 22 to a 1 MHz baseband signal, demodulate the signal thus down-converted, and measure the strength of the radio signal 22. The RF receiver 14 includes an RFIC (Radio Frequency Integrated Circuit) transceiver and a baseband receiver, although not shown specifically in FIG. 1. The down-converting and demodulating functions are assigned to the RFIC transceiver and baseband receiver, respectively. The RF receiver 14 additionally includes a signal level measuring circuit, not shown, for measuring the strength of the radio signal 22.

A baseband signal 24, demodulated by the RF receiver 14, is fed to the clock phase detector 16 and FIFO circuit 18. Also, a signal strength 26, measured by the RF receiver 14, is fed to the clock frequency determining circuit 20.

Figure 2:
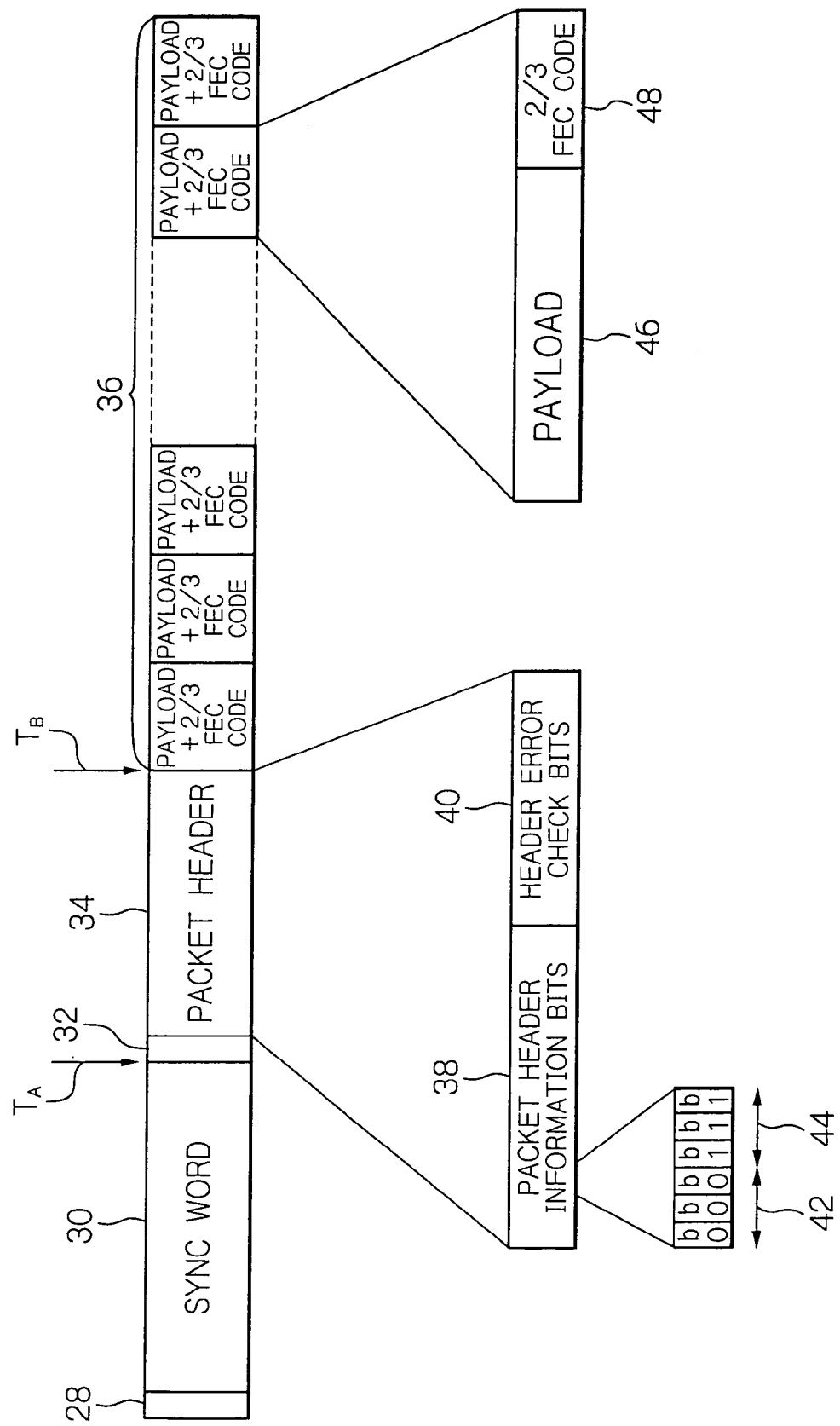
FIG. 2 shows a format particular to a packet with a ⅔ rate FEC to be received by the receiver of FIG. 1.

FIG. 2 exemplarily shows the format of a packet with a ⅔ rate FEC applied to the Bluetooth baseband signal 24. A single time slot is assigned to the baseband signal 24 every 625 microseconds. As shown in FIG. 2, the time slot is made up of three consecutive fields constituting an access code, i.e. a preamble 28, a sync word 30 and a trailer 32, a packet header 34 storing packet information and a payload 36 storing data, as named from the boundary between consecutive time slots. The preamble 28, sync word 30 and trailer 32 may be provided with the lengths of up to four bits, sixty-four bits and four bits, respectively. Also, the packet header 34 and payload 36 may be provided with the lengths of up to fifty-four bits and zero bit to 2,745 bits, respectively.

The packet header 34 has a subfield 38 assigned to packet header information bits and a subfield 40 assigned to header error check bits; the subfields 38 and 40 have the lengths of thirty bits and twenty-four bits, respectively. The subfield 38 is further divided into two ⅓ rate FEC portions 42 and 44 each having the length of three bits.

The payload 36 is divided into consecutive subfields having fifteen bits each by way of example. Each fifteen-bit subfield of the payload 36 is further divided into a payload data portion 46 actually storing data which is ten-bit long, and a portion 48 storing a five-bit, ⅔ rate FEC produced by preselected calculation executed with input ten-bit payload data. In FIG. 2, the ⅔ rate FEC is simply labeled ⅔ FEC.

It is to be noted that the preamble 28 and trailer 32 do not have to be subject to baseband processing.

Referring again to FIG. 1, the clock phase detector 16 includes shift registers 50 and a field phase detector 52. The clock phase detector 16 selectively, sequentially detects the sync word 30, packet header 34 and ⅔ rate FEC 48 of the payload 36 included in the baseband signal 24 and while delivering to the FIFO circuit 18 optimum clock phase information 54 derived from the result of detection. In addition, the clock phase detector, sequentially detected the sync word 30, packet header 34 and ⅔ rate FEC 48, feeds number-of-error information 86 indicative of whether or not an error is present to the clock frequency determining circuit 20 over a preselected period of time.

In the illustrative embodiment, in an application where N (2 or greater integer) is 13, 820 shift registers 50 are provided although not shown specifically. The shift registers 50 are adapted to share some of the shift registers assigned to a sync word, a packet header and error correction to sample the data of the input baseband signal 24. More specifically, the shift registers 50 sample the data with a sampling signal 56, see FIG. 3, which has a clock frequency N times as high as a symbol transmission rate. It follows that the number of registers 50 is represented by 63 (bits)×13 +1=820 bits, i.e. the sum of a remainder produced by subtracting the last one bit from the maximum sixty-four bits, 64-1, and the clock frequency of the sampling signal 56 higher than the baseband signal 24 by N (=13) times and one bit. This is because a sync word can be detected only if the last one bit of the sync word is taken in by the sampling signal 56 at least once.

The shift registers 50 is used to detect a packet header and an FEC as well as a sync word. While fifty-four bits and fifteen bits are respectively assigned to the detection of a packet header and the detection of an FEC, those bit lengths both are shorter than a sync word which is sixty-four bits long. For this reason, part of the 820 bits of the shift registers 50 is directly used to detect a packet header and an FEC. The tap outputs of, among the 320 bits of shift registers, the zoroth bit register and successive every thirteenth bit register, i.e. the thirteenth bit register, twenty-sixth register and so forth up to the 819-th bit register are fed to the field phase detector 52, more specifically to a sync word detector 58, a packet header detector 60 and an FEC detector 62, see FIG. 3, in parallel.

Figure 3:
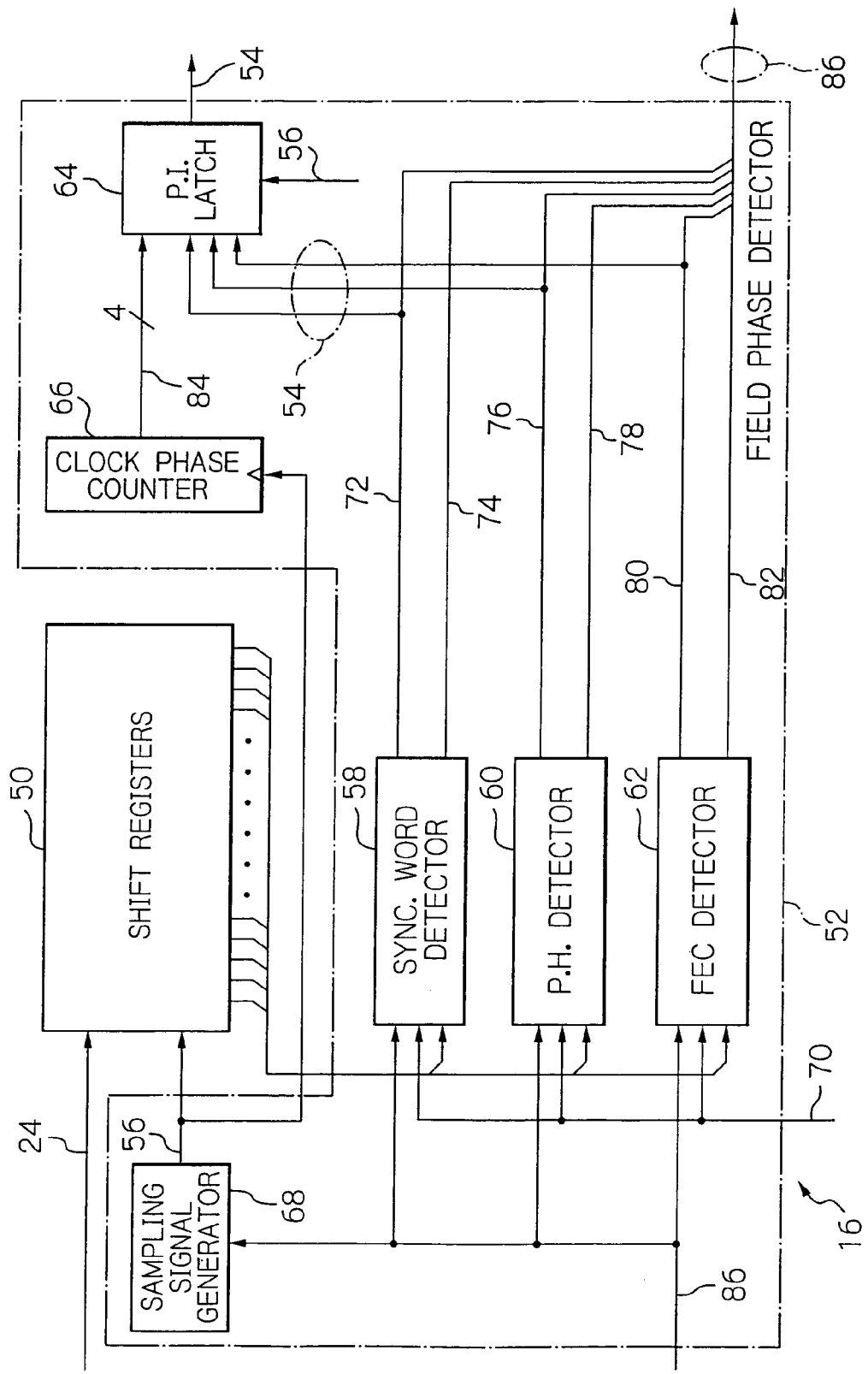
FIG. 3 is a block diagram schematically showing a specific configuration of a clock phase detecting circuit included in the illustrative embodiment.

As shown in FIG. 3, the field phase detector 52 includes a phase information latch 64, a clock phase counter 66 and a sampling signal generator 68 in addition to the sync word detector 58, packet header detector 60 and FEC detector 62. The sync word detector 58 includes a coincidence comparator, a reference sync word register, a threshold register, a comparator and a backward protector, although not shown specifically. The sync word detector 58, packet header detector 60 and FEC detector 62 each operate in response to a detector select signal 70 shown in FIGS. 1 and 3. The coincidence comparator includes sixty-four comparators and an encoder configured to encode sixty-four results of comparison to produce seven-bit data. The seven-bit data are fed to the comparator.

More specifically, in the coincidence comparator, the sixty-four comparators each receive at one end a particular symbol corresponding to one of the sixty-four bits from the shift registers 50 and receive at the other end a particular symbol of a sync word stored in the reference sync word register beforehand. Each comparator outputs a (logical) ONE when coincidence occurs or outputs a (logical) ZERO when it does not occur. The outputs of all of the comparators are input to the encoder. The encoder determines the number of, among the results of comparison, results representative of coincidence, converts the number thus determined to seven-bit data, and delivers the seven-bit data to the comparator. In this manner, the coincidence comparator determines a sliding correlation with the above processing.

The reference sync word register stores beforehand a sync word implemented as sixty-four symbols representative of a pattern to be received. The sixty-four bits of data are fed from the reference sync word register to the coincidence comparator as reference data in timed with the sampling signal 54. The threshold detector stores a threshold value used to detect synchronization. The threshold value should preferably be, but not limited to, between 50 and 64 and selected in accordance with the conditions of the received radio wave. The data output from the threshold register have seven bits like the output of the coincidence comparator.

The comparator compares the threshold value output from the threshold register with a seven-bit coincidence number output from the coincidence comparator. A sync word decision signal, showing whether or not the coincidence number is greater than the threshold value, is fed from the comparator to the backward protector.

The backward protector has a protecting function, i.e. recognizes the detection of a sync word and causes synchronization to occur in accordance with the result of recognition, thereby canceling the influence of noise contained in the baseband signal 24 and the influence of frequency shift. More specifically, the backward protector determines, e.g. whether or not the sync word decision signal remains in a detection state over, among thirteen clock cycles of a single symbol period or sampling signal 54, a preselected number of consecutive cycles or remains in the above state over, among a preselected number of cycles, a preselected number of consecutive cycles. The receiver arrangement 10 does not execute synchronization until the result of decision output from the backward protector becomes positive. In this sense, the backward protector corresponds to a backward protector included in a frame sync circuit.

The backward protector with the above configuration delivers an actual sync word detection signal 72 to the phase information latch 64 as a signal that provides optimum phase information. In addition, the backward protector delivers the result of error detection effected packet by packet to the clock frequency determining circuit 20 packet by packet as number-of-error information 74. The number-of-error information 74 includes the number of error bits allowed by the number of N-time clock cycles and threshold decision. Particularly, the number-of-error information 74 includes SYNC_ERR[I] where the bracketed argument I denotes a time variable representative of a past packet.

The packet header detector 60, also operating in response to the detector select signal 70, includes a packet header detector and a backward protector, although not shown specifically. The packet header detector includes a calculator and a comparator. The calculator performs preselected calculation with packet header information included in the fifty-four bits fed from the shift registers 50 to thereby generate packet header error check bits and delivers the error check bits to the comparator. The comparator compares, bit by bit, the packet head error bits thus fed from the calculator and packet header error bits received from the transmitting station. Only if the two kinds of packet header error bits all are identical with each other, the comparator feeds a packet header decision signal to the backward protector.

The backward protector, like the backward protector of the sync word detector 58, has a protecting function, i.e. recognizing function of detecting a packet header and causing synchronization to occur in accordance with the result of recognition, thereby canceling the influence of noise contained in the baseband signal 24 and the influence of frequency shift. More specifically, the backward protector determines that the data are correct if the packet header decision signal remains in a detection state over, among thirteen clock cycles of a single symbol period or sampling signal 54, a preselected number of consecutive cycles or remains in the above state over, among a preselected number of cycles, a preselected number of consecutive cycles. The receiver arrangement 10 does not execute synchronization until the result of decision output from the backward protector becomes positive.

More specifically, when the condition stated above is satisfied, the backward protector feeds an actual packet header detection signal 76 to the phase information latch 64 as a signal that provides optimum phase information. Also, the backward protector delivers the results of packet-by-packet error detection to the clock frequency determining circuit 20 as number-of-error information 78 particular to the packet header 34, FIG. 2, packet by packet. The number-of-error information 78 includes the number of N-times higher clock cycles, the cycle values of samples with errors, and the number of error bits determined by ⅓ rate FEC check. Particularly, the number-of-error information 78 includes HEADER_ERR[I]. The number-of-error information 78 is delivered to the clock frequency determining circuit 20 packet by packet.

The FEC detector 62, also operating in response to the detector select signal 70, outputs optimum phase information relating to the payload 36, FIG. 2, and packet-by-packet error information. More specifically, the FEC detector 62 includes a ⅔ rate FEC detector and a backward protector that match with the payload 36, although not shown specifically. The ⅔ rate FEC detector includes a calculator and a comparator. The calculator performs preselected calculation with fifteen bits fed from the shift registers 50 to thereby generate a ⅔ FEC and feeds the ⅔ FEC to the comparator. The comparator compares the ⅔ FEC input from the calculator and a ⅔ rate FEC received from the transmitting station bit by bit. Only if the bits of the two kinds of FECs all are identical with each other, then the comparator delivers a ⅔ rate FEC decision signal to the backward protector.

The backward protector, like the backward protectors assigned to a sync word and a packet header, performs the recognizing function of detecting a ⅔ rate FEC and outputs optimum EFC phase information 80 that causes synchronization to occur in accordance with the recognition, thereby canceling the influence of noise contained in the baseband signal 24 and the influence of frequency shift. In addition, the backward protector outputs number-of-error information 82 particular to the payload 36.

More specifically, the backward protector determines that the data are correct if the ⅔ rate FEC code decision signal remains in a detection state over, among thirteen clock cycles of a single symbol period or sampling signal 54, a preselected number of consecutive cycles or remains in the above state over, among a preselected number of cycles, a preselected number of consecutive cycles. The receiver arrangement 10 does not execute synchronization until the result of decision output from the backward protector becomes positive. Only if the above condition is satisfied, then the backward protector feeds the ⅔ rate FEC detection signal 80 to the phase information latch 64.

Further, the backward protector delivers number-of-error information 82 representative of the number of, among ten bits constituting each data subfield of the payload 36, bits with errors to the clock frequency determining circuit 20 packet by packet. The number-of-error information 82 includes the number of N-times higher clock cycles, the cycle numbers of cycles with errors, and the number of error bits determined by ⅔ rate FEC check. More specifically, to output error information relating to the payload 36, the backward protector detects random errors, as distinguished from simple phase shifts, to thereby produce RANDOM_ERR[I] for the ⅔ rate FEC and delivers RANDOM_ERR[I] thus produced to the clock frequency determining circuit 20 together with PAYLOAD_LENGTH[I] representative of payload length packet by packet. Why the payload length of a packet is stored is that it may differ from one packet to another packet, so that the occurrence of random errors can be estimated in terms of a mean value.

The number-of-error information 74, 78 and 82 output from the sync word detector 58, packet header detector 60 and FEC detector 62, as stated above, all are fed to the clock frequency determining circuit 20 together as number-of-error information 86 mentioned earlier.

On the other hand, the sync word detection signal 72, packet header detection signal 76 and ⅔ rate FEC detection signal 80, collectively labeled 54, are input to the phase information latch 64 as enable signals each being output from one of the detectors 58, 60 and 62 selected. The phase information latch 64 temporarily holds a count 84 representative of a four-bit clock phase in synchronism with the sampling signal 56 and outputs the count 84 as clock phase information 54 mentioned earlier, which is representative of an optimum clock phase field by field.

More specifically, when the coincidence comparator of the sync word detector 58, included in the clock phase detector 16, is selected by the detector select signal 70, the sync word detection signal 72 is fed from the coincidence detector to the phase information latch 64, as stated previously. On the other hand, when the packet header detector 60 is designated by the detector select signal 70, the packet header detection signal 76 is fed from the packet header detector 60 to the phase information latch 64. Further, when the FEC detector 62 is selected by the same signal 70, the ⅔ rate FEC detection signal 80 is fed from the FEC detector 62 to the phase information latch 64. By checking the count 84 output from the clock phase counter 66 and the detection signal 72, 76 or 80, the phase information latch 64 can find a particular clock phase in which detection represented by the detection signal 72, 76 or 80 has occurred.

Assume that the number of cycles used as a reference for synchronization, i.e. the number of times of detection for backward protection is one. Then, in the clock phase detector 16, the backward protectors of the sync word detector 58, packet header detector 60 and FEC detector 62 may be considered to immediately output a sync word decision signal, a packet header decision signal and an FEC decision signal, respectively, as the sync word detection signal 72, packet header detection signal 76 and ⅔ rate FEC detection signal 80. Such backward protectors may therefore be considered to be absent in the detectors 58, 60 and 62.

With the configuration described above, the clock phase detector 16 may be considered to have a function of sampling and separating the baseband signal 24, a function of detecting optimum clock phase information field by field, and a function of outputting number-of-error information.

Optimum clock frequency information 88, see FIG. 1, is input to the clock phase detector 16 as a clock control signal. The optimum clock frequency information 88, corresponding to a clock control signal for sampling the input baseband signal 24 with the N-times higher sampling signal, is input to the sampling signal generator 68.

The sampling signal generator 68 outputs a sampling frequency N times as high as the frequency of the baseband signal 24. In the illustrative embodiment, the maximum value of N is thirteen and determined by dividing the number of output bits by the number of shift registers included in the shift registers 50. The sampling signal generator 68 includes an oscillator for generating a basic clock and a multiplier for multiplying the basic clock, although not shown specifically. The optimum clock frequency information or clock control signal 88 is input to the multiplier. In response, the multiplier produces the sampling signal 56 from N-time information based on the click control signal 88 and feeds the sampling signal 56 to the shift registers 50, reference sync word register, threshold register and clock phase counter as well as to a tap selector not shown.

Referring again to FIG. 1, the FIFO circuit 18 has a clock switching function for writing input data in response to a clock synchronous to the baseband signal 24 and reading them out in response to an internal clock, not shown, generated within the receiver arrangement 10. In addition, the FIFO circuit 18 has a function of outputting the individual payloads one by one although this function will not be described specifically. To switch the clock, the FIFO circuit 18 is supplied with the optimum clock phase information 54 output from the clock phase detector 16 field by field. The FIFO circuit 18 is therefore capable of stably outputting a signal read out in synchronism with the internal clock, which is based on the above optimum clock phase information 54, as a received symbol 90.

The FIFO circuit 18 additionally serves as a buffer that takes account of, e.g. frequency drift. The length of the buffer is determined by the value of allowable frequency drift. Considering the maximum packet length of about 3 milliseconds particular to Bluetooth, if frequency drift of up to 5 microseconds is allowed in the above packet length, then the range is plus or minus five symbols. In this case, the buffer may be provided with a length of eleven symbols.

In the receiver arrangement 10, a frequency drift corrector may precede the FIFO circuit 18 in order to correct a shift dependent on whether or not the transition points of the baseband signal 24 are synchronous.

The clock frequency determining circuit 20 grasps a pattern in which noise appears in accordance with the signal strength 26, the number-of error information 86, and link information indicative of estimated receipt of the next packet and information relating to the current transmitting station or source. The signal strength 26 is input to the clock frequency determining circuit 20 in the form of an RSSI (Received Signal Strength Indicator).

Figure 4:
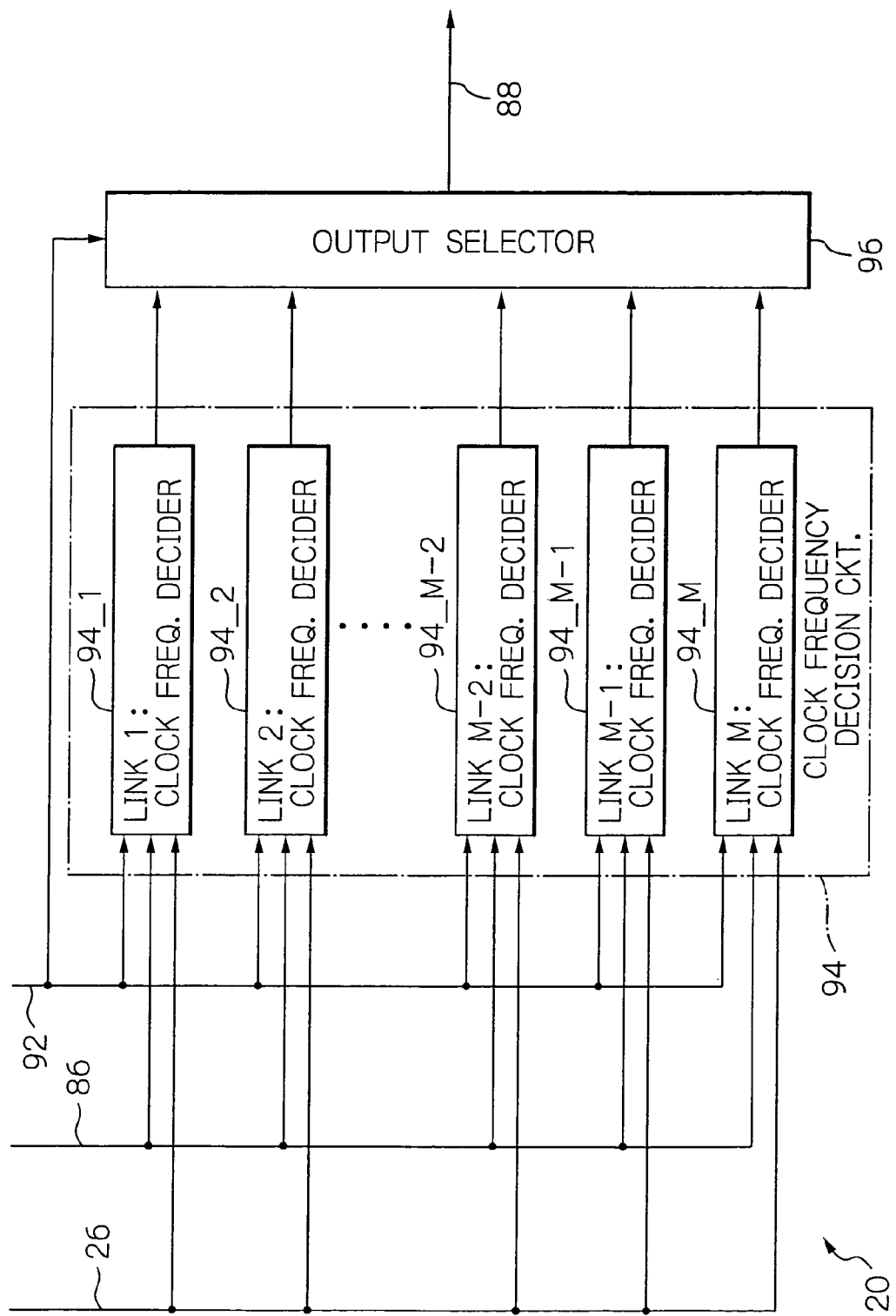
FIG. 4 is a block diagram schematically showing a specific configuration of a clock frequency determining circuit also included in the illustrative embodiment.

FIG. 4 shows a specific configuration of the clock frequency determining circuit 20. As shown, the clock frequency determining circuit 20 is generally made up of a clock frequency decision circuit 94 and an output selector 96. The clock frequency decision circuit 94 includes M clock frequency deciders 94_1, 94_2, . . . , 94_M2, 94-M1 and 94_M each being assigned to a particular station that may be linked to the receiver arrangement 10. The signal strength 26, number-of-error information 86 and link information 92 are input to each of the M clock frequency deciders 94-1 through 94_M. Each of the clock frequency deciders has a memory function for storing the signal strength 26 and number-of-error information 86, performs calculation with the number-of-error information 86 stored over a preselected period of time, and compares clock frequencies corresponding to the result of calculation and signal strength 26, respectively, to thereby determine whether or not the current condition matches with an optimum condition. These functions will be described more specifically later. The outputs of the M clock frequency deciders are connected to the inputs of the output selector 96.

When, e.g. the link information 92 coincides with any one of link numbers 1, 2, . . . , 94_M-2, 94_M-1 and 94_M assigned to the clock frequency deciders 94_1, 94_2, . . . , 94_M-2, 94_M1 and 94_M, respectively, only the clock frequency decider with the coincident link number is enabled and caused to output the optimum clock frequency information to the output selector 96. This configuration successfully saves powder, compared to a configuration that enables all of the M clock frequency deciders.

While the clock frequency decision circuit 94 uses the link information 92 as a select signal in the illustrative embodiment, it may alternatively generate a select signal for each link in accordance with the link information 92 and use the select signal as an enable signal.

The output selector 96 generates a switch signal in accordance with the link information 92 to thereby deliver the optimum clock frequency information 88 relating to the link supplied to the clock phase detector 16. Thus, the output selector 96 is used to surely match the optimum clock frequency information 88 to the link information 92. As shown in FIG. 3, in the clock phase detector 16, the clock frequency information 88 is fed to the sync word detector 58, packet header detector 60, FEC detector 62 and sampling signal generator 68.

Figure 5:
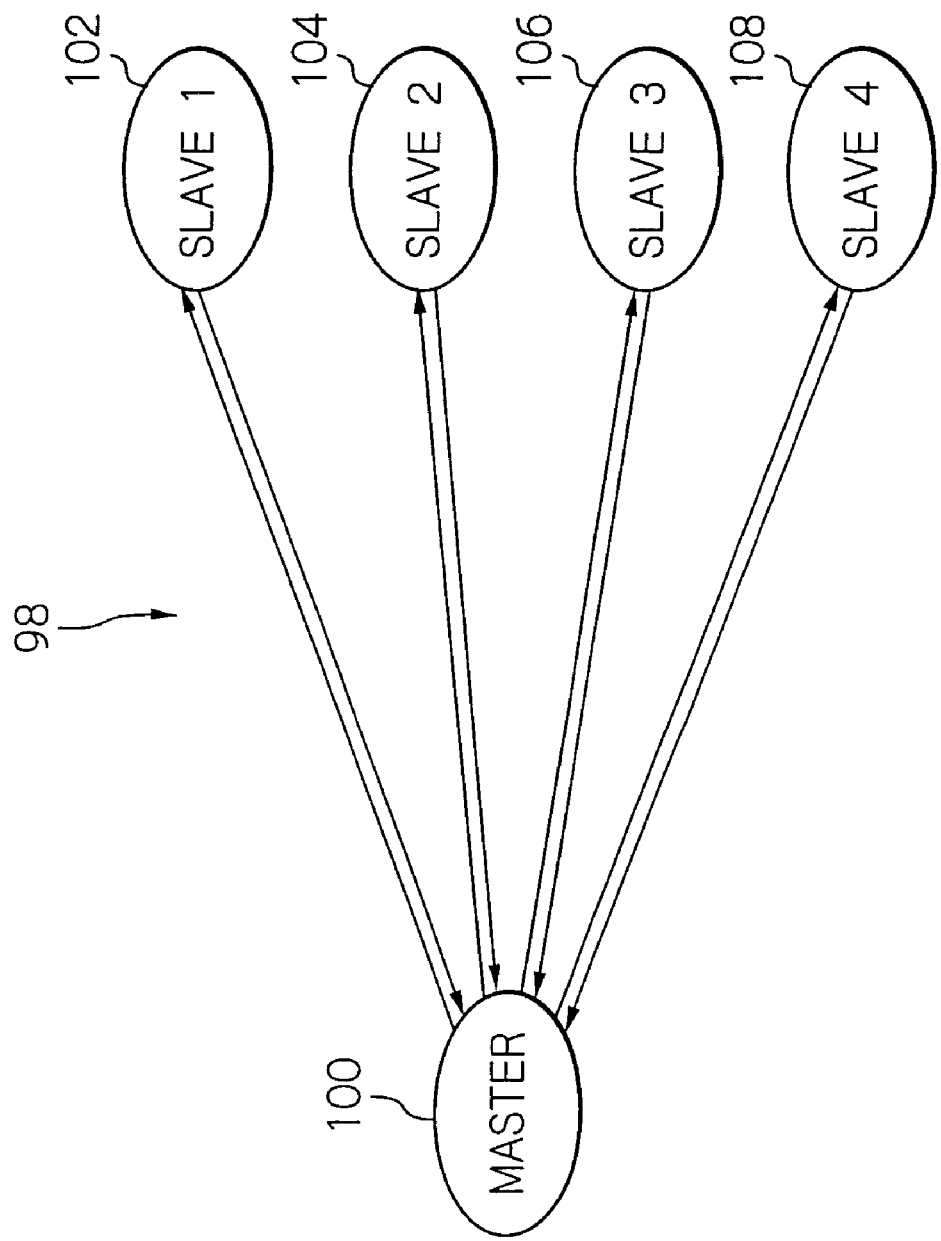
FIG. 5 shows a specific Bluetooth system in which a master, implemented by the receiver of FIG. 1, and a plurality of slaves are interconnected.

The significance of the clock frequency decision circuit 94 will be briefly described hereinafter. As shown in FIG. 5, a specific Bluetooth system 98 includes a single master or subject unit 100 and a plurality of slaves or the other parties to communicate 102, 104, 106 and 108 communicable with the master 100. In FIG. 5, the slaves 102 through 108 are shown as communicating with the master 100 at the same time. In this case, the slaves 102 through 108 send respective link information 92 to the master 100 together with packets identifying the slaves.

In the illustrative embodiment, for the master 100, a subject means one of the slaves 102 through 108 selected by the master 100 and, in this sense, differs from the subject unit of FIG. 5.

Figure 6:
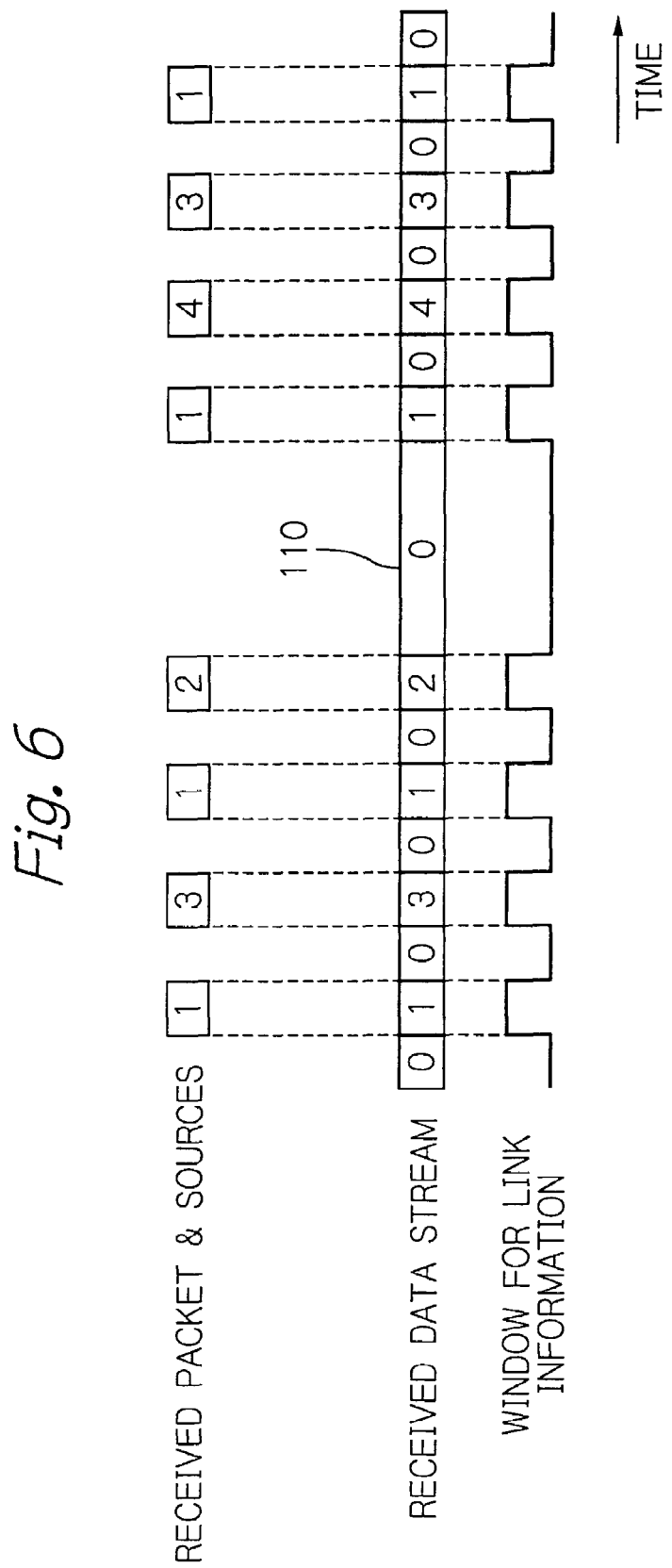
FIG. 6 is a timing chart showing a relation between a data stream and link information received by the receiver of FIG. 1.

In the Bluetooth system 98, the slaves 102 through 108 simultaneously communicate with the master 100 on a time division basis. In this case, as shown in FIG. 6 specifically, the master 100 receives a data stream 110 from the slaves 102 through 108. It is therefore important for the master 100 to identify the salves 102 through 108 packet by packet. For this purpose, the master 100 uses a window whose size matches with the communication time of the individual slave to take in the link information 92, thereby determining a relation between each packet and the source sent the packet.

If desired, the link information 92 may contain the kind and length of a packet sent and may additionally play the role of a flag representative of a calculation range up to the end of a packet.

By determining correspondence between packets and sources sent them, as stated above, it is possible to store the signal strength 26 and number-of-error information in, e.g. a memory source by source and generate the optimum clock frequency information 88 in accordance with such information. Subsequently, the sampling signal 56 is generated in accordance with the optimum clock frequency information 88 so as to effect sampling with the optimum clock, so that an error ascribable to the shift of detection timing occurs little.

A specific operation of the receiver arrangement 10 will be described hereinafter. Basically, the receiver arrangement 10 is operated in the same manner as the improved received data reproducing device stated earlier, optimally adjusting the clock phase in each field of a packet. The receiver arrangement 10 executes such adjustment with some unique processing steps added to the processing steps of the improved reproducing device, as will be described hereinafter.

To better understand the processing steps unique to the illustrative embodiment, how a simplified pattern in which noise or error sample appears varies with respect to time will be described with reference to FIGS. 7A through 7F. Assume that a single symbol period has thirteen (N=13) consecutive cycle values, and that detection is effected at desired positions A, B and C in the payload 36 of a single packet. The positions A, B and C are simply representative of consecutive times; time expires in order of A, B and C. FIGS. 7A, 7B and 7C and FIGS. 7D, 7E and 7F each show a particular error pattern detected by sampling, which is effected at the positions or times A, B and C.

Figure 7A:
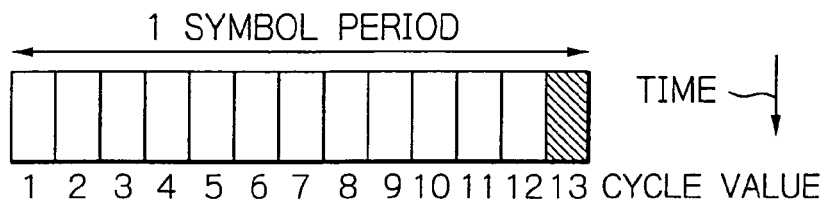
FIGS. 7A through 7F show specific transitions of two kinds of noise patterns that may occur in the receiver of FIG. 1 with respect to time.
Figure 7B:
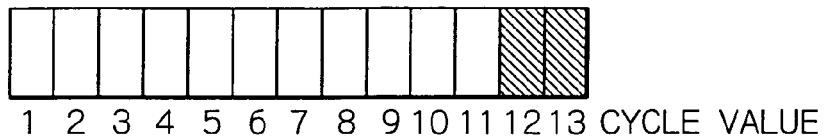
Figure 7C:
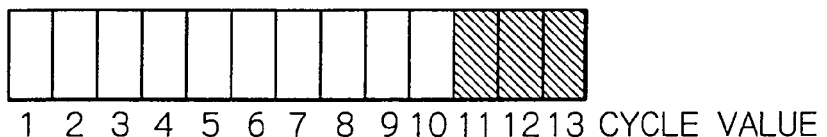

FIGS. 7A, 7B and 7C show a specific pattern in which an error sample shifts at a certain constant period. More specifically, as shown in FIG. 7A, an error is detected only at the cycle value 13 in a single symbol period by sampling effected at the time A. As shown in FIGS. 7B and 7C, if the clock of the slave or source is higher in rate than the clock of the receiver arrangement 10, then the position where the error is detected sequentially shifts forward, i.e. in the direction in which the cycle value decreases. Conversely, if the clock of the slave is lower in rate than the clock of the receiver arrangement 10, then the above position shifts backward, i.e. in the direction in which the sample value increases. In the illustrative embodiment, the receiver arrangement 10 causes the phase to follow such a shift of the error sample for thereby canceling the error state.

Figure 7D:
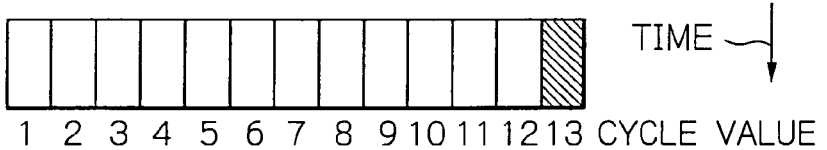
Figure 7E:
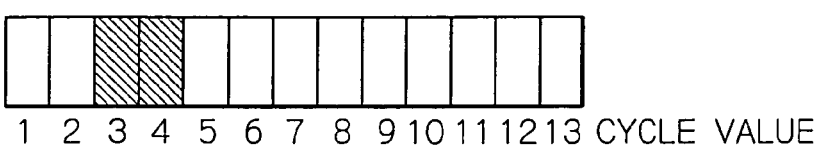
Figure 7F:
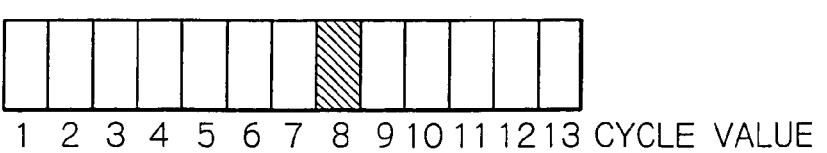

On the other hand, FIGS. 7D, 7E and 7F each show a particular pattern in which random noise appears at a certain constant period. As shown, the position where noise appears is random. In such a case, if the frequency of the sampling signal is low, then the probability that an error is detected increases. In light of this, the receiver arrangement 10 increases the frequency of the sampling signal. Because the error rate varies in accordance with the strength of a received signal, the receiver arrangement 10 should preferably be configured to, e.g. estimate the variation of the error rate and increase, if the error rate tends to increase, the frequency of the sampling signal beforehand. In any case, the receiver arrangement 10 calculates an optimum clock frequency to cancel random noise.

Hereinafter will be described an algorithm for calculating an optimum clock frequency. First, the RF receiver 14 obtains the signal strength 26 and link information 92 while demodulating the received signal 22. FIG. 8 shows a specific relation between the signal strength 26 and the error rate and assumed by the RF receiver or RFIC 14. As shown, the error rate tends to sharply increase when the signal strength 26 exceeds −60 dBm. Using the characteristic of FIG. 8, the receiver arrangement 10 maintains the clock frequency low when the signal strength 26 is between 0 dBm and −60 dBm, but sequentially increases the clock frequency when the signal strength 26 is lower than −60 dBm in accordance with the drop of the signal strength 26. This control preserves desirable receipt conditions despite that the clock frequency is maintained low when an error does not occur, causing the receiver arrangement 10 to consume a minimum of power. On the other hand, when an error tends to frequency occur, communication quality is improved.

When the RF receiver 14 uses the characteristic shown in FIG. 8, the clock frequency determining circuit 20 is provided with a specific table 111 shown in FIG. 9 that lists different signal strengths 26 and different clock frequencies in one-to-one correspondence. As shown, the table 111 lists four consecutive ranges of signal strengths stepwise and four clock frequencies each being assigned to one of the four ranges of signal strengths. In this case, the signal strength 26 is adaptive to any one of an instantaneous value, a preselected period of time, a preselected division and so forth. As for Bluetooth, a preselected division mentioned above refers to, e.g. a mean value produced when a certain number of packets are received.

Figure 10:
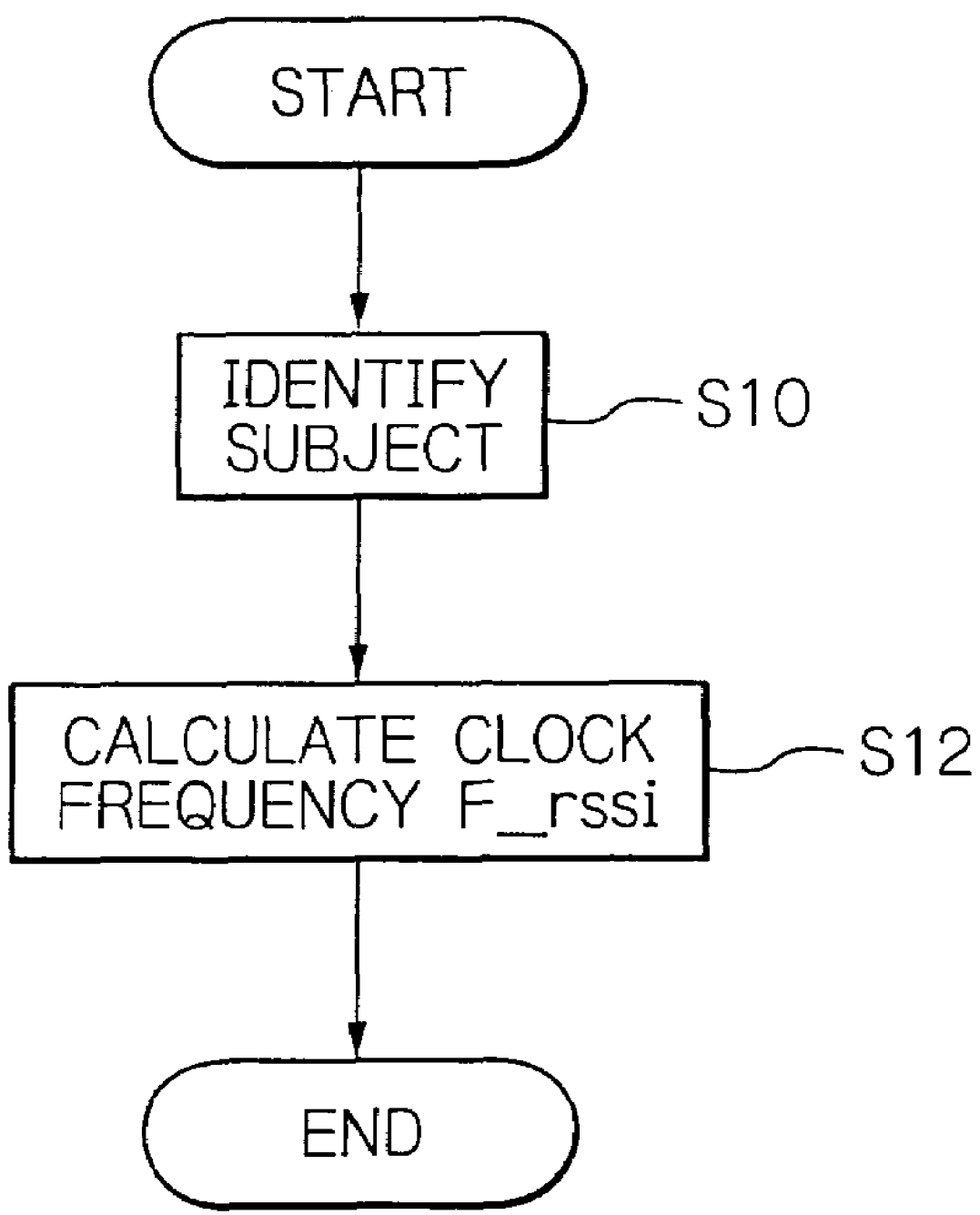
FIG. 10 is a flowchart demonstrating a procedure in which a subject clock frequency decider, included in the clock frequency determining circuit, calculates an optimum clock frequency F_rssi.

Before the selection of a clock frequency stated above, the RF receiver 14 obtains the link information 92 included in the data stream 110, FIG. 6, and feeds the link information 92 to the clock frequency determining circuit 20. As shown in FIG. 10, in the clock frequency determining circuit 20, the clock frequency deciders 94_1 through 94-M each identify a particular subject of calculation on the basis of the link information 92 (step S10). As a result, only the clock frequency decider matching with the link information 92 is enabled, as stated earlier.

The clock frequency deciders 94_1 through 94_M each are configured not only to calculate a clock frequency F_rssi, but also to calculate and make decision on a clock frequency F_err and to make a final decision.

The subject clock frequency decider thus enabled uses only the signal strength 26 to calculate an optimum clock frequency or first clock frequency F_rssi (step S12) The clock frequency decider then selects one of the clock frequencies 4 MHz, 6 MHz, 12 MHz and 24 MHz corresponding to the optimum clock frequency F_rssi.

Subsequently, the subject clock frequency decider executes repetitive processing P10 shown in FIGS. 10 and 11 so as to obtain number-of-error information respectively relating to a sync word, a packet header and a payload and store the number-of-error information every I-th packet received.

Figure 11:
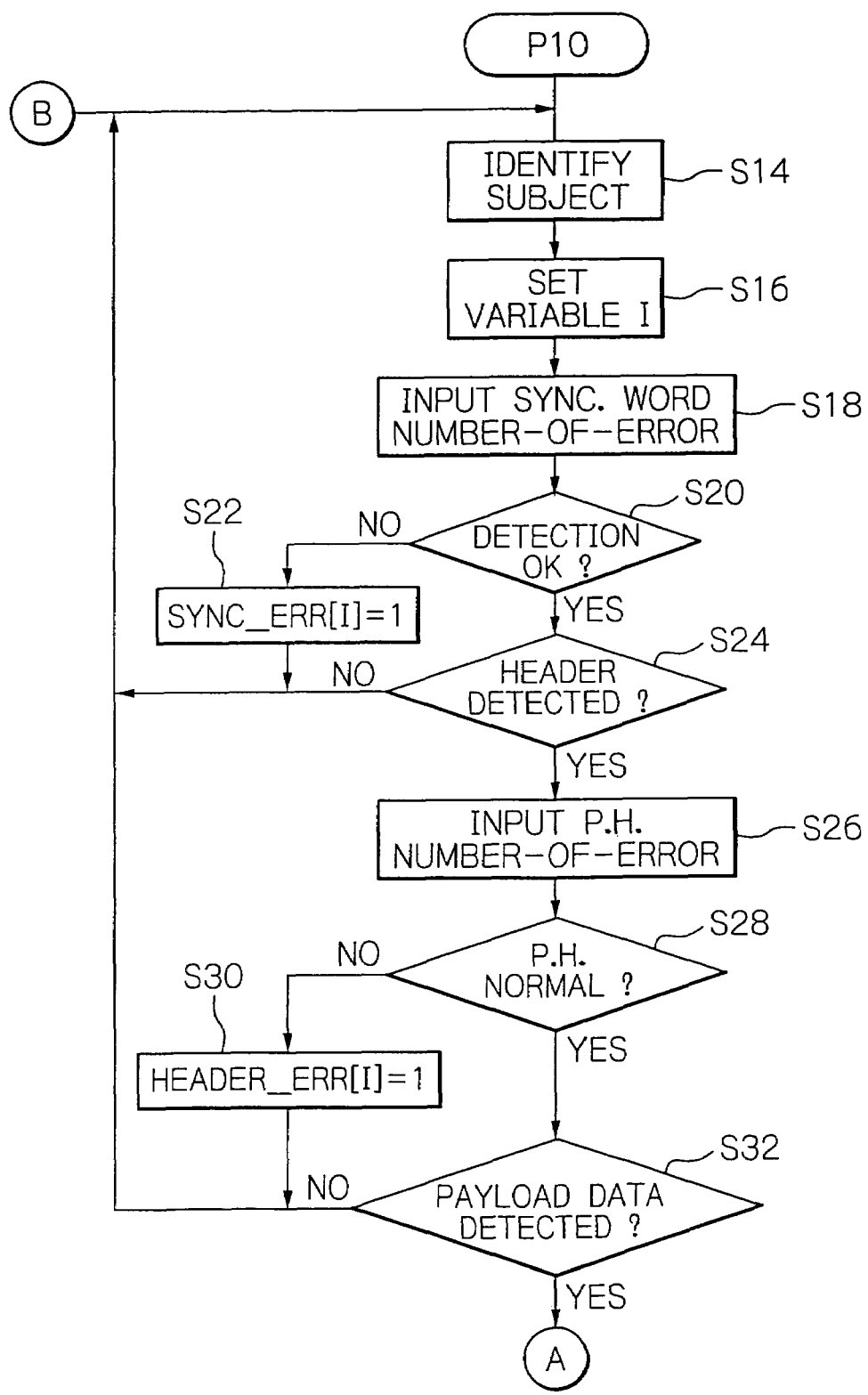
FIG. 11 is a flowchart showing part of error information processing to be executed by the subject clock frequency decider.

More specifically, as shown in FIG. 11, one of the M clock frequency deciders 94_1 through 94_M is enabled first as a subject clock frequency decider (step S14). Subsequently, a variable I represented by a variable i and a number of times P is set. The variable i is the initial value representative of, e.g. the last time while the number of times P is a variable representative of a packet received P times before. Generally, the variable i is represented by a relation of i−P+1. For example, assuming that the variable i is −1 indicative of the last time, then the variable for receipt having occurred four times before, i.e. P=−4 is −4 produced by −1−4+1, see FIG. 13.

The sync word 30 of the received packet is detected, and then number-of-error information 74 is input to the subject clock frequency decider (step S18). In response, the subject clock frequency decider determines whether or not the sync word was correctly detected on the basis of the number-of-error information 74 (step S20). If the answer of the step S20 is negative (NO), then the I-th error counter SYNC_ERR[I] is incremented to 1 (step S22). This is again followed by the step S14. On the other hand, if the answer of the step S20 is positive (YES), then the count of the I-th error counter SYN_ERROR[I] is maintained zero.

When the answer of the step S20 is YES, whether or not a packet header 34 is present in the received packet is determined (step S24). If the answer of the step S24 is NO, then the procedure returns to the step S14. If the answer of the step S24 is YES, then number-of-error information 78 relating to the packet header 34 is input to the subject clock frequency decider (step S26).

The subject clock frequency detector, received the number-of-error information 78, determines whether or not the packet header 34 is normal (step S28). If the answer of the step S28 is NO, then the I-th error counter HEADER_ERR[I] is incremented to 1 (step S30). Again the procedure returns to the step S14. If the answer of the step S28 is YES, then the I-th error counter HEADER_ERR[I] is maintained zero.

Figure 12:
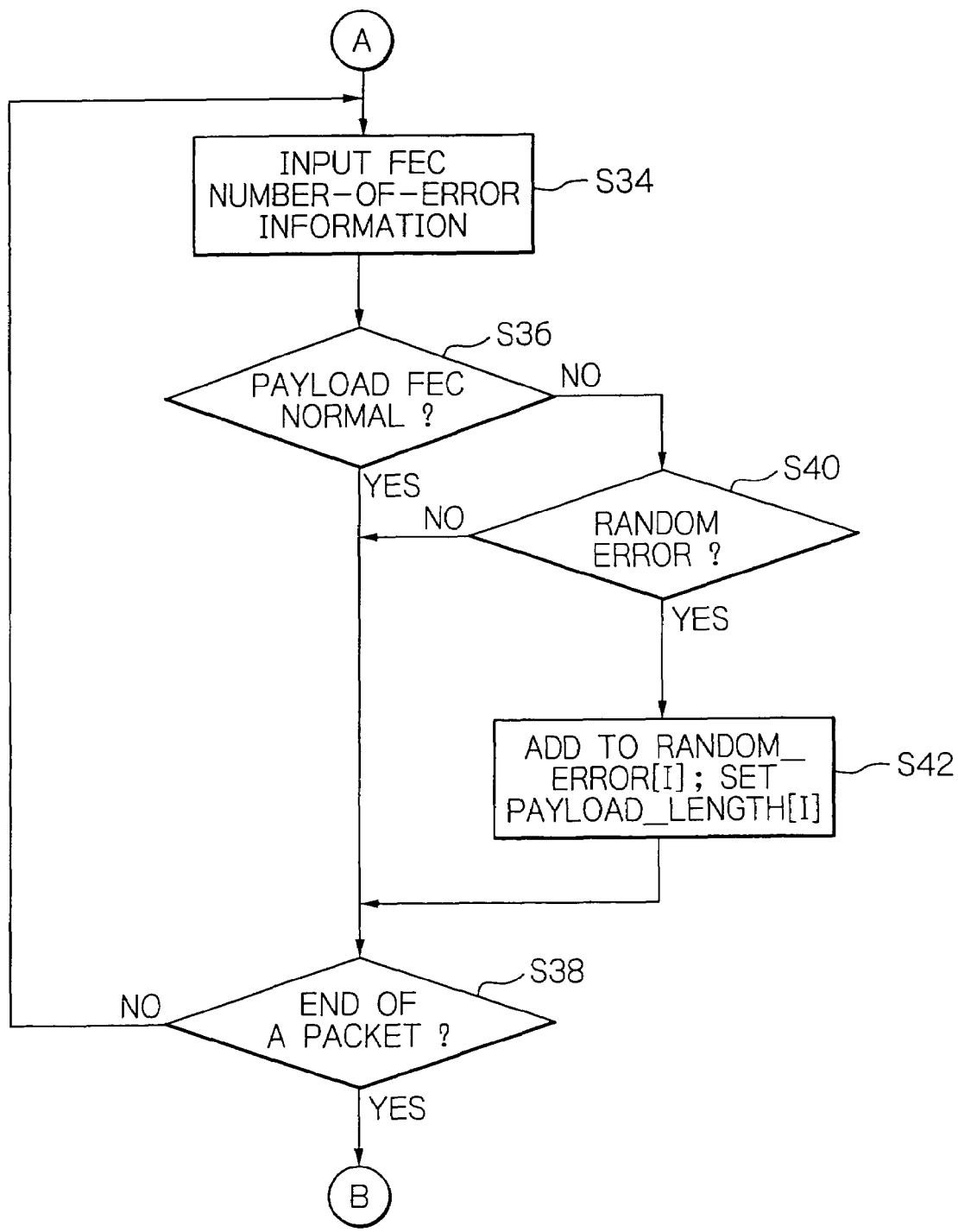
FIG. 12 is a flowchart showing the remaining part of the processing shown in FIG. 11.

When the answer of the step S28 is YES, whether or not any payload data 46 is present in the payload 36 is determined (step S32). If the answer of the step S32 is NO, then the procedure returns to the step S14. If the answer of the step S32 is YES, then the procedure advances to a step S34 shown in FIG. 12 via a connector A. In the step S34, number-of-error information 82 relating to the payload 46 is input to the subject clock frequency decider.

Subsequently, whether or not the FECs of the entire payload 36, for example, are normal is determined on the basis of the number-of-error information 82 (step S36). If the answer of the step S36 is YES, then the I-th error counter RANDOM_ERR[I] is maintained zero. This is followed by a step S38 for determining whether or not the entire packet has been received.

If the answer of the step S36 is NO, then whether or not the error detected is random error is determined on the basis of whether or not regularity is present at the position where the error appeared (step S40) More specifically, when the error positions detected at the times A, B and C, FIGS. 7D, 7E and 7F, are different from each other, the error is determined to be random error. This is followed by a step S42. If the answer of the step S40 is NO, i.e. if the error is derived from a phase shift, as shown in FIGS. 7A, 7B and 7C, then the I-th error counter RANDOM_ERR[I] for a single packet is maintained zero, and PAYLOAD_LENGTH[I] is set (step S42). The step S42 is followed by the step S38.

When the error is determined to be random error, as stated above, the subject clock frequency decider sets the I-th error counter RANDOM_ERR[I] and PAYLOAD_LENGTH[I] relating to a single packet. Particularly, when the number of bits representative of the non-coincidence of an FEC is 1, 1 is set in the error counter RANDOM_ERR[I]; when the number of bits is 2 or above, 2 is set in RANDOM_ERR[I].

In the step S38 executed when the answer of the step S36 is YES or after the step S42, whether or not the entire packet has been received is determined. If the answer of the step S38 is NO, meaning that some payload data not dealt with yet is left, then the procedure returns to the step S34. If the answer of the step S38 is YES, then the procedure returns to the step S14, FIG. 11, via a connector B in order to store number-of-error information relating to the next received packet.

As shown in FIG. 13, when the repetitive processing P10 described above is repeated, the clock frequency deciders 94_1 through 94_M each hold five different kinds of data, i.e. the sync word error SYNC_ERR[I], packet header error HEADER_ERR[I], random error RANDOM_ERR[I], packet length PAYLOAD_LENGTH[I] and PKT_TYPE[I] representative of the kind of a packet on a packet basis. The last packet receipt, the before-last packet receipt and the packet receipt having occurred P times before are respectively represented by i, i−1 and i−P+1=I. The clock frequency deciders 94_1 through 94_M each have a memory capacity large enough to store the five items shown in FIG. 13 over P consecutive times.

Figure 14:
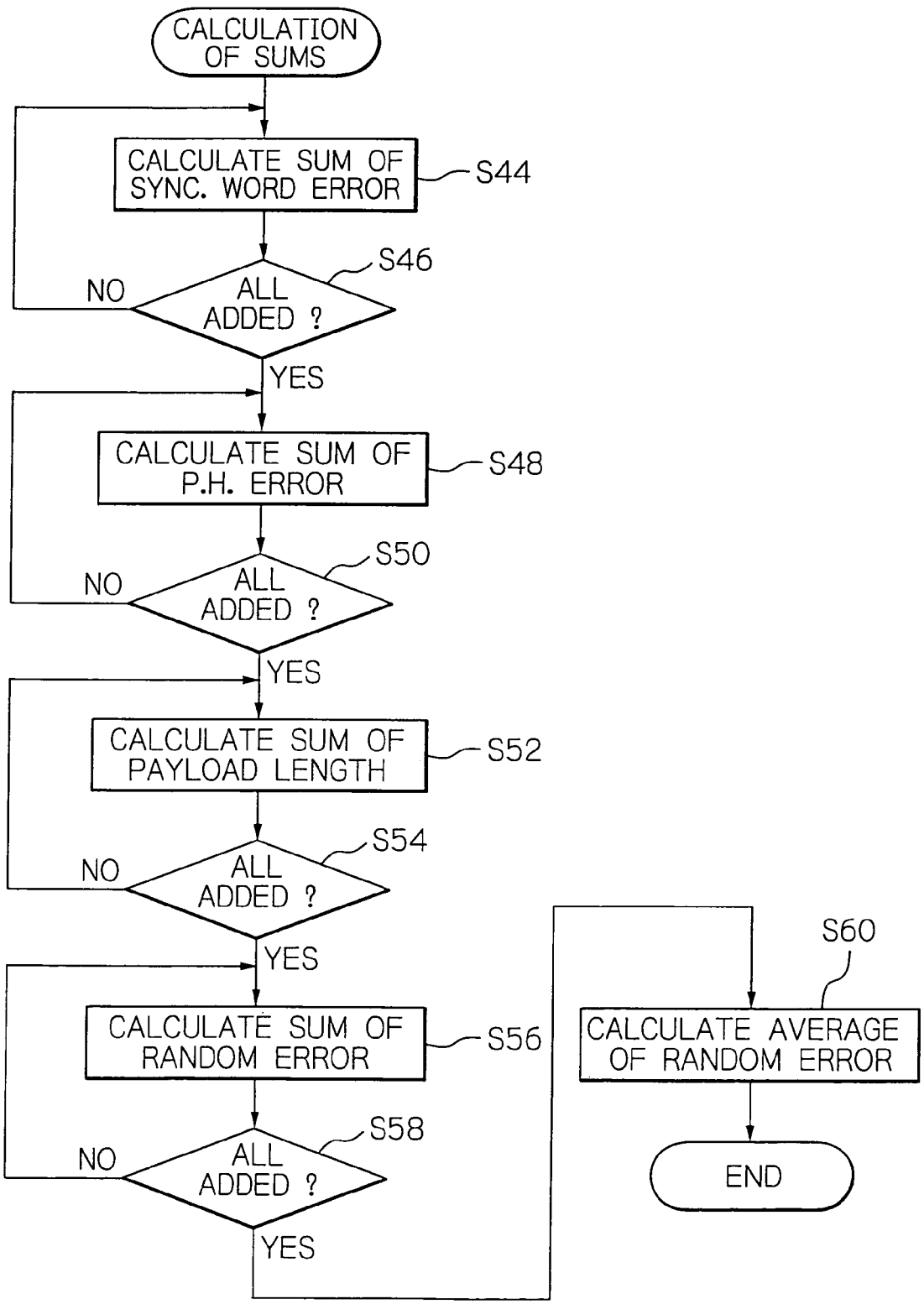
FIG. 14 is a flowchart demonstrating a procedure in which the subject clock frequency decider calculates sums and the average value of random errors.

Subsequently, as shown in FIG. 14, the data stored over P consecutive times are summed up item by item. First, the sync word errors SYNC_ERR[I] of consecutive received packets are sequentially summed up to thereby produce a total error SYNC_ERR_SUM=SYNC_ERR[i]+SYNC_ERR[i−1]+SYNC_ERR[i+2]++SYNC_ERR[i−P+1] (step S44). In the Illustrative embodiment, addition is expected to be repeated P times. Subsequently, whether or not all the sync word errors SYNC_ERR[I] have been summed up is determined (step S46). If the answer of the step S46 is NO, then the step S44 is repeated.

If the answer of the step S46 is YES, then the packet header errors HEADER_ERR[I] of consecutive received packets are sequentially summed up to thereby produce a total error HEADER_ERR_SUM=HEADER_ERR[i]+SYNC_ERR[i−1]+HEADER_ERR[i+2]++HEADER_ERR[i−P+1] (step S48). Again, in the illustrative embodiment, addition is expected to be repeated P times. Subsequently, whether or not all the header errors HEADER_ERR[I] have been summed up is determined (step S50). If the answer of the step S50 is NO, then the step S48 is repeated.

If the answer of the step S50 is YES, then the packet lengths of the consecutive received packets are sequentially summed up to thereby produce a total packet length PAYLOAD_LENGTH_TOTAL=PAYLOAD_LENGTH[i]+PAYLOAD_LENGTH[i−1]+PAYLOAD_LENGTH[i−2]++PAYLOAD_LENGTH[i−P+1] (step S52). The total packet length is used to estimate the errors having occurred in all of the past payloads 36. Again, in the illustrative embodiment, addition is expected to be repeated P times. Subsequently, whether or not all the packet lengths PAYLOAD_LENGTH [I] have been summed up is determined (step S54). If the answer of the step S54 is NO, then the step S52 is repeated.

If the answer of the step S54 is YES, then the random errors RANDOM_ERR[I] of the consecutive received packets are sequentially summed up to thereby produce a total random error RANDOM_ERR_SUM=RANDOM_ERR[i]+RANDOM_ERR[i−1]+RANDOM_ERR[i−2]++RANDOM_ERR[i−P+1] (step S56). Again, in the illustrative embodiment, addition is expected to be repeated P times. Subsequently, whether or not all the random errors RANDOM_ERR[I] have been added is determined (step S58). If the answer of the step S58 is NO, then the step S56 is repeated.

If the answer of the step S58 is YES, then the total random error RANDOM_ERR_SUM is divided by the total packet length PAYLOAD_LENGTH_TOTAL to thereby produce an average random error RANDOM_ERROR_AVE (step S60). More specifically, considering the fact that the data length of a payload is not constant, as stated previously, estimation is executed by converting the total random error RANDOM_ERR_SUM having occurred over the last P times to a unit length. This is the end of the procedure shown in FIG. 14.

Figure 15:
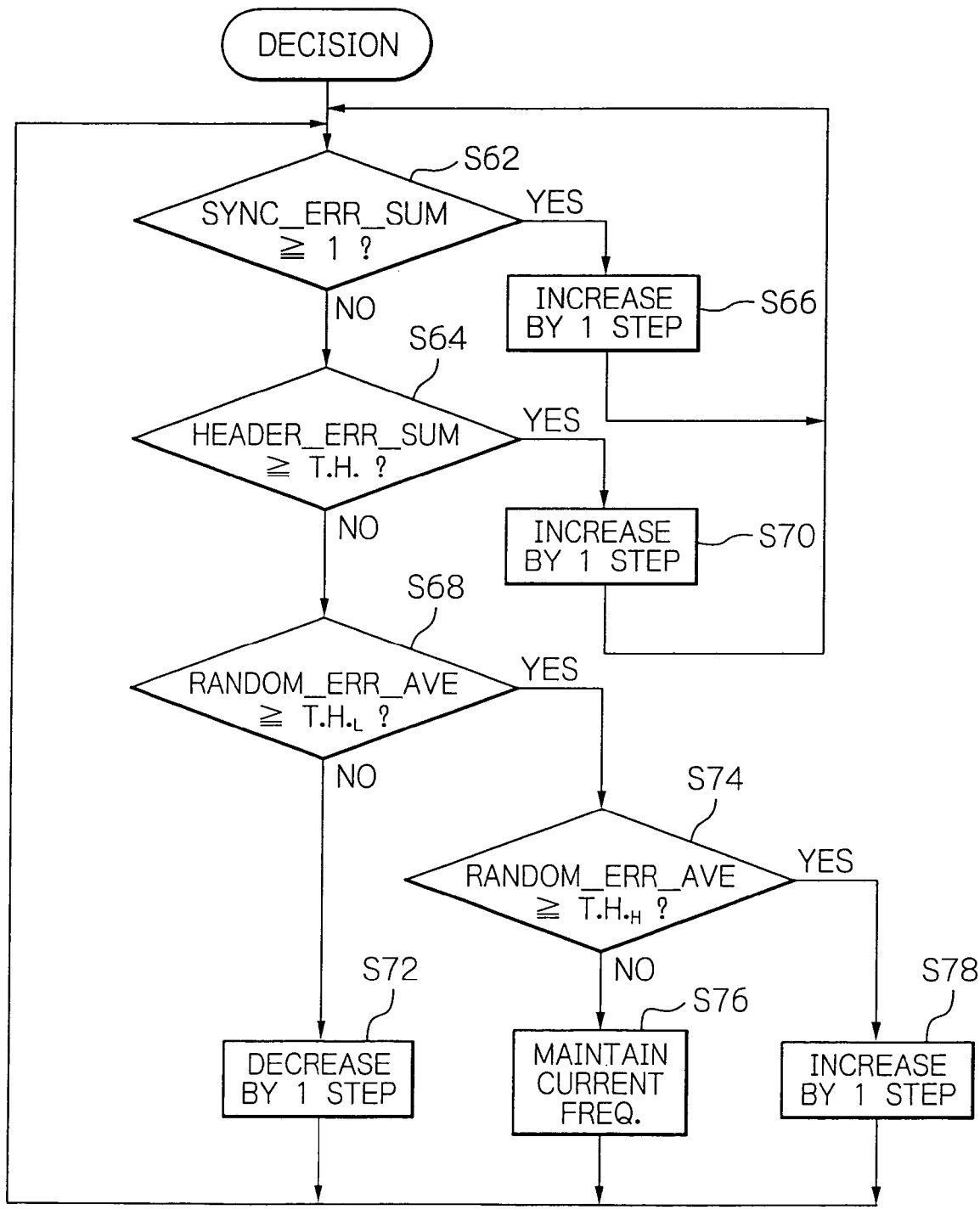
FIG. 15 is a flowchart showing a procedure in which the subject clock frequency decider selects an optimum clock frequency F_err in accordance with the results of decision using item-by-item thresholds.

FIG. 15 demonstrates decision processing following the processing of FIG. 14 and executed by use of the four different data items calculated in FIG. 14. The decision processing to be described determines an optimum clock frequency F_err. As shown, whether or not the total sync word error SYNC_ERR_SUM is 1 or above is determined first (step S62). If the answer of the step S62 is NO, then the current clock frequency is determined to be adequate. This is followed by a step S64 relating to packet header errors.

If the answer of the step S62 is YES, then it is determined that the current clock frequency is inadequate. In this case, the current clock frequency is replaced with another clock frequency higher than the current clock frequency by one step and stored in the table 111, FIG. 9, (step S66). The clock frequency thus newly selected is set as an optimum clock frequency F_err. After the step S66, the step S62 is repeated.

In the step S64, executed when the answer of the step S62 is NO, whether or not the total packet header error HEADER_ERR_SUM is equal to or greater than a threshold HEADER_TH set beforehand. If the answer of the step S64 is NO, then the current clock frequency is determined to be adequate, and then a step S68 is executed.

If the answer of the step S64 is YES, then the current clock frequency is determined to be inadequate, i.e. unable to suppress errors. In this case, the current clock frequency is replaced with another clock frequency higher than the current clock frequency by one step and stored in the table 111, FIG. 9, (step S70). The clock frequency thus newly selected is set as an optimum clock frequency F_err. Again, the step S70 is followed by the step S62.

In the step S68, executed when the answer of the step S64 is NO, whether or not the average random error RANDOM_ERR_AVE is equal to or greater than a lower threshold RANDOM_LOW_TH set beforehand is determined. If the answer of the step S68 is NO, then the current clock frequency is determined to be inadequate, and then a step S72 is executed.

If the answer of the step S68 is YES, then whether or not the average random error RANDOM_ERR_AVE is equal to or higher than an upper threshold RANDOM_HIGH_TH set beforehand is determined (step S74). If the answer of the step S74 is NO, meaning that the current clock frequency is between the upper limit and the lower limit, the current clock frequency is determined to be adequate and maintained as an optimum clock frequency F_err (step S76). After the step S76, the step S62 is repeated.

In the step S78 executed when the answer of the step S68 is NO, it is determined that even a clock frequency lower than the current clock frequency can suppress errors. In this case, a clock frequency lower than the current clock frequency by one step and listed in the table 111 is selected and set as a new optimum clock frequency F_err. The step S78 is also followed by the step S62 stated earlier.

By the decision procedure shown in FIG. 15, an optimum clock frequency F_err is selected and set thereafter.

The illustrative embodiment assumes four different clock frequencies of 4 MHz, 6 MHz, 12 MHz and 24 MHz, as shown in FIG. 9. Therefore, the subject clock frequency decider maintains the current lowest frequency when indicated to set a frequency lower than 4 MHz or maintains the current highest frequency when indicated to set a frequency higher than 24 MHz.

Figure 16:
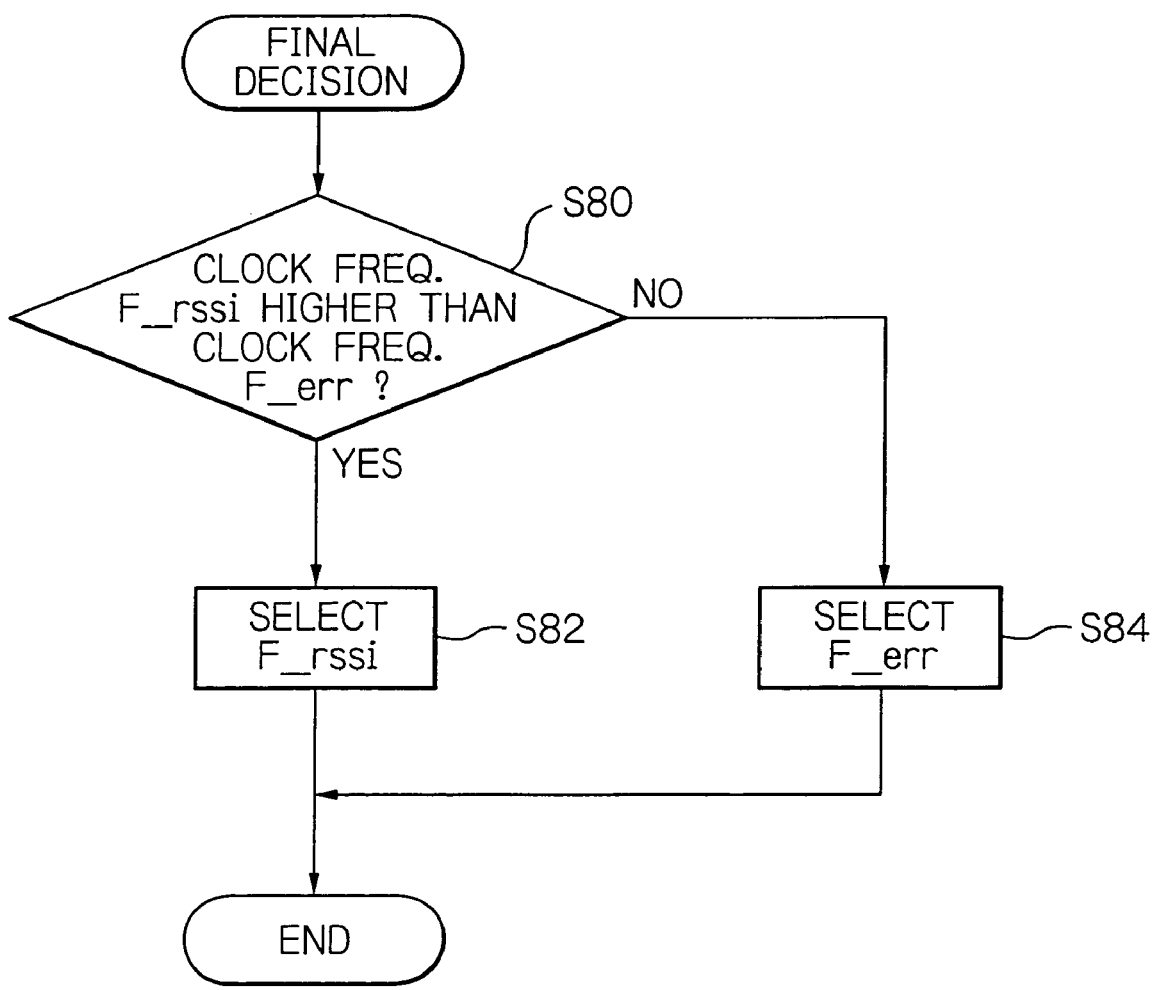
FIG. 16 is a flowchart showing a final decision procedure for determining an optimum clock frequency.

FIG. 16 demonstrates final decision processing following the procedure described above. As shown, whether or not the clock frequency F_rssi determined previously is higher than the clock frequency F_err calculated on the basis of the errors (step S80) IF the answer of the step S80 is YES, then the clock frequency F_rssi is selected (step S82). If the answer of the step S80 is NO, then the other clock frequency F_err is selected (step S84). The clock frequency F_rssi or F_err thus selected is fed to the output selector 96 as optimum clock frequency information generated by the subject clock frequency decider.

More specifically, when the signal strength 26 is −50 dBm by way of example, the clock frequency F_rssi of 4 MHz is selected from the table 111, FIG. 9. At this instant, if the clock frequency F_err calculated on the basis of the errors is 12 MHz, then 12 MHz higher than 4 MHz is selected by the procedure of FIG. 16.

The clock frequency information thus produced by the M clock frequency deciders 94_1 through 94_M are input to the output selector 96. The output selector 96 uses the link information 92 as a select signal to select one of the above clock frequency information output from the subject clock frequency decider. The clock frequency information selected by the output selector 96 is fed to the clock phase detector 16 as information output from the clock frequency determining circuit 20, i.e. optimum clock frequency information 88.

The illustrative embodiment adjusts the optimum clock frequency in accordance with the signal strength 26 and the transition of a noise pattern with the algorithm or procedure described above. In practice, however, the details of the algorithm for actually calculating an optimum clock frequency may noticeably vary in dependence on, e.g. the characteristics of the RF receiver 14. It is therefore preferable that the clock frequency determining circuit 20 be programmable so as to adapt itself to the variation of the algorithm. On receiving the optimum clock frequency information 88, the clock phase detector 16 is ready to sample a packet to be received next with the sampling signal 56 having the optimum clock frequency for thereby providing the optimum phase information.

By adjusting the clock frequency of the sampling signal 56 packet by packet, as described above, the illustrative embodiment preserves the quality of received data and saves power at the same time. Further, the illustrative embodiment estimates the transition of an error rate from the signal strength or RSSI and then raises the clock frequency of the sampling signal before an error actually occurs, thereby enhancing the quality of received data processing. More specifically, for the adjustment, a particular optimum clock frequency is produced from each of the signal strength and decision on an index derived from the number-of-error information, and then one optimum clock frequency higher than the other optimum clock frequency is selected. This is successful to enhance the accuracy of received data processing as well.

While the foregoing description has concentrated on the receiver arrangement 10 based on Bluetooth, the present invention is, of course, applicable to any kind of receiver so long as it receives the baseband signal of serial data. Also, the optimum clock frequency for the sampling signal 56 may be produced from any information source other than the signal strength 26 and number-of-error information relating to a sync word, a packet header and an FEC.

Figure 17:
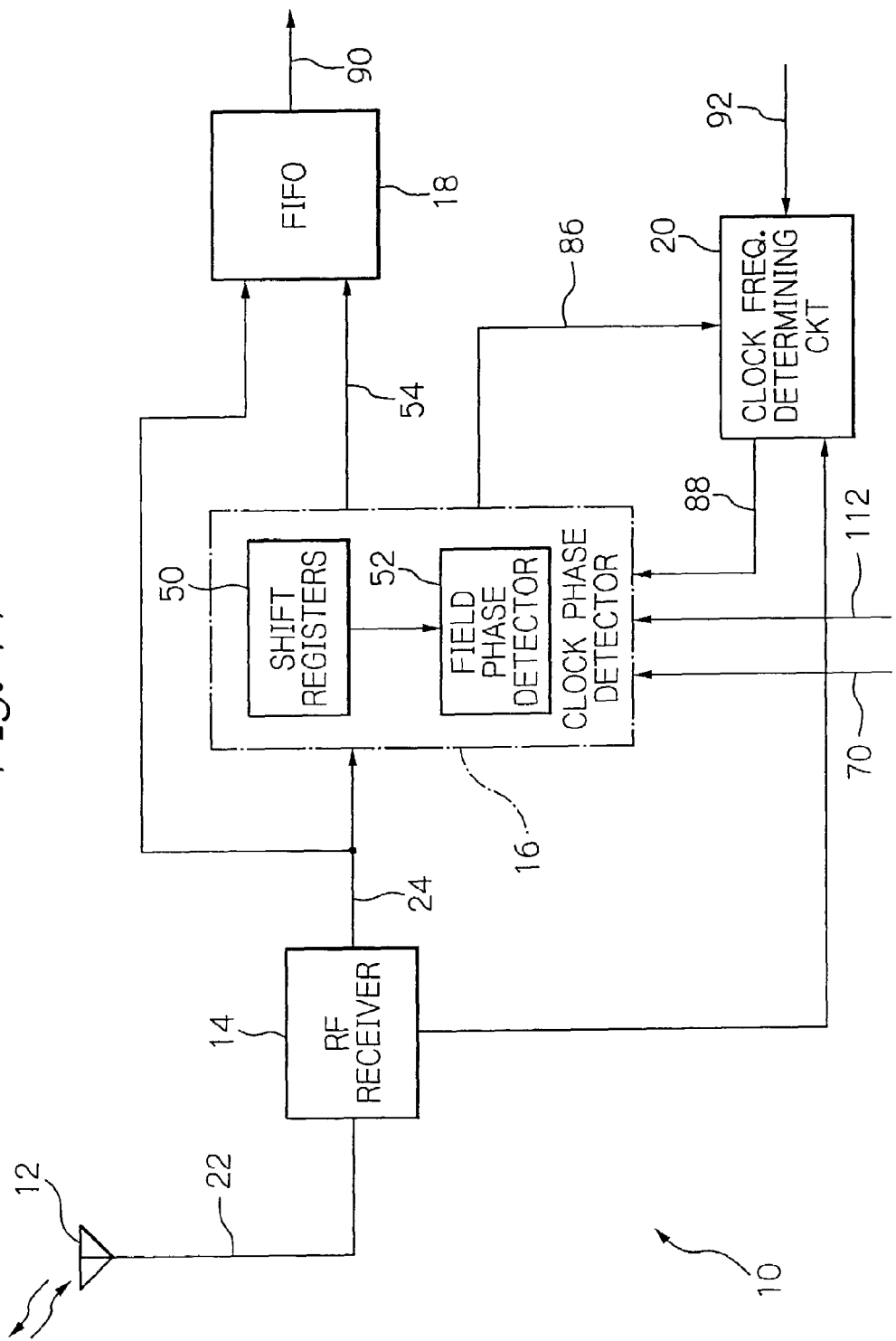
FIG. 17 is a schematic block diagram showing an alternative embodiment of the invention.

Reference will be made to FIG. 17 for describing an alternative embodiment of the receiver arrangement 10. As shown, the alternative embodiment of the receiver arrangement 10 is basically identical with the receiver arrangement 10 of FIG. 1 except that a switch timing signal 112 is additionally input' to the clock phase detecting circuit 16.

More specifically, as shown in FIG. 18, a switching controller 114 arranged outside of the clock phase detector 16 feeds the switch timing signal 112 to the detector 16 while receiving the sampling signal 56. The packet format shown in FIG. 2 specifically is stored in the switching controller 114 beforehand. It is possible to determine the range or boundary of a single packet by starting incrementing a count by use of the sampling signal 56 at the time when a sync word is detected, although not shown specifically. When the count coincides with a preselected boundary of a packet, the switching controller 114 generates the switch timing signal 112 and feeds it to the sampling signal generator 68.

The connection of the field phase detector 52 is slightly modified in matching relation to the input of the switch timing signal 112. More specifically, the optimum clock frequency information 88 and switch timing signal 112 are input to the sampling signal generator 68. The sampling signal generator 68 feeds the sampling signal 56 not only to the shift registers 50, phase information latch 64 and clock phase counter 66 but also to the sync word detector 58, packet header detector 60 and FEC detector 62.

The switch timing signal 112 is generated by an outside circuit that manages a packet by calculating the last bit position of the packet header 34 and the position of the FEC of the payload 36 from the time when the sync word 30 is detected, as will be seen from the format of FIG. 2. More specifically, the switch timing signal 112 is generated between, e.g. the sync word 30 and the packet header 34 and between the packet header 34 and the FEC of the payload 36.

The operation of the alternative embodiment of the receiver arrangement 10 will be briefly described hereinafter. Assume that the clock frequency is operated with, e.g. thirteen (N) cycles. Then, when the sync word detector 58 detects a sync word whose sixty-four bits all are coincident, the number-of-error information 74 representative of no error is input to the clock frequency determining circuit 20. In response, in the clock frequency determining circuit 20, the subject clock frequency decider, matching with the link information 92, determines that the receipt condition is good, and then replaces the clock frequency with a lower frequency.

The switch timing signal 112 is generated between the sync word 30 and the packet header 34 at a time indicated by an arrow $T_A$ in FIG. 2 and between the packet header 34 and the payload 36 at a time indicated by an arrow $T_B$ in FIG. 2. The latest optimum clock frequency information 88 derived from the subject packet is input to the sampling signal generator 68 at the above times $T_A$ and $T_B$, there by switching the clock frequency of the sampling signal 56. The clock frequency of the sampling signal 56 can therefore be flexibly varied in the middle of packet receipt. More specifically, the alternative embodiment of the receiver arrangement 10 is capable of varying the clock frequency without waiting for the arrival of the next subject packet.

As stated above, the alternative embodiment of the receiver arrangement 10 switches the clock frequency not after the receipt of one entire packet, but at preselected timing during the receipt of the packet. The receiver arrangement 10 can therefore rapidly adapt itself even to a condition wherein the error rate sharply changes.

As described above, in the illustrative embodiments, the RF receiver 14 determines the signal strength of a received signal and feeds the signal strength to the clock frequency determining circuit 20. The clock phase detector 16 feeds to the clock frequency determining circuit 20 the number-of-error information 86 relating to the sync word, packet header and payload each occupying a particular field. The clock frequency determining circuit 20 designates a subject to deal with the packet on the basis of the number-of-error information 86 and link information 92, selects optimum one of resulting optimum clock frequency information 88, and inputs the optimum information 88 to the clock phase detector 16. Therefore, the sampling signal 56 generated in the clock phase detector 16 is not only matched to the transmitting station, but also provided with a clock frequency matching with the generation of random noise or similar occurrence in the receiver arrangement 10, there by providing optimum phase information. Consequently, the received signal 90 output from the FIFO circuit 18 with an adjusted phase can be accurately reproduced.

With the above configuration, the receiver arrangement 10 can reproduce received data stably with high quality. In addition, the receiver arrangement 10 saves power by causing only the designated subject to operate.

While the illustrative embodiments have been shown and described in relation to Bluetooth, the present invention can accurately, stably reproduce even the data of a baseband signal. The above advantages are achievable even with a baseband signal also.

The clock phase detector includes the clock phase counter 66, phase information latch 64 and sampling signal generator 68. The sync word detector 58 detects a sync word included in input data, which is fed via the shift registers 50, thereby outputting synchronization detection information 72. At the same time, the sync word detector 58 checks each packet for errors to thereby output the number-of-error information 74 reflecting the result of check. The packet header detector 60 and FEC detector 62, arranged in parallel to the sync word detector 58, each confirm accurate receipt by comparing data relating to errors and generated when data is present and, among the input data, data relating to errors, thereby outputting optimum phase information derived from the error detection. At the same time, the packet header detector 60 and FEC detector 62 each check the packet for errors and output the number-of-error information 78 or 82, respectively, reflecting the result of check.

Consequently, number-of-error information representative of a relation between a slave output the subject packet and the receiver arrangement 10 as to signal conditions can be produced for each item of the packet and fed to the clock frequency determining circuit 20.

In the clock frequency determining circuit 20, one of the M clock frequency deciders 94_1 through 94_M, each being matched to a particular station to communicate, that matches with the link information is operated to calculate a clock frequency for a sampling signal on the basis of the signal strength and number-of-error information 86. The subject clock frequency decider then determines whether or not the clock frequency calculated is optimum. Subsequently, the output selector selects frequency information determined to be optimum in accordance with the ink information and then delivers the optimum frequency information to the clock phase detector 16. It is therefore possible to provide optimum clock frequency information while saving power by effecting selective operation.

The M clock frequency deciders each update and store a program, which is used to calculate the frequency of the sampling signal, in accordance with the characteristics of the received signal, providing the receiver arrangement 10 with flexibility.

The clock phase detector 16 is connected such that the optimum frequency information determined by the sampling signal generator 68 and frequency adjusted in response to the switch timing signal 112 are fed to the sync word detector 58, packet header detector 60 and FEC detector 62. The switch timing signal 112 is fed from the switching controller 114, which is located outside of the clock phase detector 16 and also receives the optimum clock frequency information 88. With this configuration, the clock phase detector 16 can rapidly take in the optimum clock frequency information 88 without waiting for a packet to be dealt with next and can therefore flexibly adapt to a change in the conditions of the received signal.

The switch timing signal 112 is fed at the boundary between, among the portions of the baseband signal 24 divided by a preselected cycle division, items which are the subject of detection of optimum phase information, also implementing flexible operation.

In accordance with the frequency adjusting method of the receiver arrangement 10, after link information relating to sources or transmitting stations have been obtained, the strength of a signal received from a subject source is determined by a select signal corresponding to the subject source. Subsequently, an optimum clock frequency or first clock frequency $F\_rssi$, matching with the above signal strength is produced. On the other hand, with consideration given to the sync word 30, packet header 34 and payload data, payload-by-payload optimum phase information 54 and item-by-item number-of-error information 86 are produced. The number-of-error information 86 and information relating thereto, e.g. packet length are stored for every packet of the received signal. The information thus stored are summed up over past preselected P times to thereby calculate a mean value of the entire payload 36. The mean value is used to determine an optimum clock frequency or second clock frequency $F\_err$.

Subsequently, the two optimum clock frequencies $F\_rssi$ and $F\_err$ are compared, and higher one of them is selected as optimum clock frequency information 88 and then output in response to the link information or select signal 92. This procedure allows the signal received from a slave linked to the receiver arrangement 10 to be sampled by optimum clock frequency matching with the slave. Consequently, the received signal can be output with its phase adjusted in synchronism with optimum phase information and can therefore be stably output with high quality. In addition, the selective operation of a particular subject successfully saves power.

By determining the clock frequency $F\_rssi$ with reference to the table 111 listing candidate clock frequencies, it is possible to set a clock frequency taking account of the conditions of the received signal.

The items of a unit packet comprise the sync word 30, packet header 34 and payload 36 storing data. The payload length PAYLOAD_LENGTH[I] is stored as information relating to the number-of-error information packet by packet. Estimation is therefore effected not only with the current number-of-error information but also with the past tendency, allowing the stability of the system with respect to time to be also estimated.

The produce the average value, the sum RANDOM_ERR_SUM of the packet-by-packet payload number-of-error information 82 and the sum PAYLOAD_LENGTH_TOTAL of the packet-by-packet payload lengths are calculated. The sum RANDOM_ERR_SUM is then divided by the sum PAYLOAD_LENGTH_TOTAL. The resulting average value allows the payload 36 to be accurately estimated despite that its length is not constant.

As for the clock frequency F_err, if the sum SYNC-ERR-SUM of the number-of-error information relating to the sync word 30 is 1 or above, then first processing or step-up processing for increasing the clock frequency F_err by one step is executed. If the result of the above decision is negative, then the candidate clock frequency selected in the first processing is replaced with a candidate with higher frequency and then output. Subsequently, whether or not the total number-of-error information HEADER_ERR_SUM of the packet header 34 is greater than the threshold HEADER_TH is determined. If the answer of this decision is positive, then step-up processing is executed. If otherwise, whether or not the mean value of the payload 36 is above the lower threshold RANDOM_LOW_TH is determined. If the result of this decision is positive, then whether or not the mean value of the payload 36 is above the upper threshold is determined. If the answer of this decision is negative, second processing or step-down processing for varying the clock frequency F_ERR is executed.

More specifically, the candidate clock frequency stored in the step-down processing is replaced with a candidate with lower frequency. Subsequently, whether or not the mean value of the payload 36 is above the upper threshold RANDOM_HIGH_TH is determined. If the answer of this decision is positive, then step-up processing is executed; if otherwise, the current clock frequency is maintained as the clock frequency F_ERR.

After the consecutive processing stated above, the procedure returns to the beginning and allows a clock frequency to be selected in matching relation to the occurrence of errors.

Further, the method of the illustrative embodiments takes in the clock frequency information 88 determined in response to the switch timing signal 112 and adjusts the clock frequency accordingly. It is therefore possible to rapidly, flexibly adapt to the varying conditions of the received signal and therefore to output a high-quality reproduced signal.

In summary, it will be seen that the present invention provides a received data reproducing device and a frequency adjusting method therefor capable of stably reproducing received data with high accuracy and saving power by causing only a particular subject to operate.

The entire disclosure of Japanese patent application No. 2003-172032 filed on Jun. 17, 2003, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A received data reproducing device comprising:

a measuring circuit for measure a signal strength of a received signal;

an optimum phase detecting circuit for dividing a phase of a frequency particular to the received signal into N, where N is 2 or greater integer, to sample the received signal with a sampling signal multiplied in accordance with N, storing a sampled value for each of divided phases, outpouring optimum clock phase information for the received data derived from error information of each field, which is set in accordance with a communication standard of the received signal, and output error presence/absence information obtained in the event of detection of the error information;

a frequency determining circuit for determining an optimum frequency of the sampling signal on the basis of the signal strength measured, the error presence/absence information output field by field and link information indicative of a station communicating with said received data reproducing device, and feed the optimum frequency information to said optimum phase detecting circuit;

a buffer circuit for taking in the received signal and then adjusting the phase of the received signal with individual clock phase information corrected to read out the received signal;

a sync word detector for executing processing for detecting synchronizing data included in input data, which are fed via a phase sampling/storing circuit for sampling the baseband signal with the sampling signal in accordance with a phase of said baseband signal while sequentially storing resulting sampled data, to thereby output synchronization detection information, checking, during the processing, every packet produced by dividing the input data for errors, and outputting, as the error presence/absence information, number-of-error information relating to synchronization and reflecting a result of checking;

an error confirming circuit arranged in parallel to said sync word detector for comparing data relating to errors and generated when the data are present with, among the input data, data relating to errors to thereby confirm accurate receipt to output optimum phase information derived from error detection, and checking every packet for errors to output number-of-error information reflecting a result of checking as the error presence/absence signal;

a phase counter for cyclically outputting a count, which is output in synchronism with the sampling signal, as optimum clock phase information;

a phase information latch for latching the optimum clock phase information in response to a confirmation signal representative of accurate receipt and fed to said optimum phase detecting circuit field by field, and then outputting the optimum clock phase information; and a sampling signal generator supplied with N-time information from an outside of said optimum phase detecting circuit as a clock control signal for generating, in accordance with N indicated by the clock control signal, a sampling signal N times as high as the baseband signal in frequency.

2. The device in accordance with claim 1, wherein said measuring circuit demodulates the received signal transmitted by radio to thereby convert the received signal to a baseband signal.

3. The device in accordance with claim 2, wherein said frequency determining circuit comprises:

a plurality frequency deciders each being assigned to a particular station to communicate for calculating a frequency of the sampling signal on the basis of the signal strength and the number-of-error information and determining whether or not the frequency calculated is optimum; and an output selector for selecting frequency information, which has the frequency determined to be optimum, in accordance with the link information and outputting the frequency information to said optimum phase detecting circuit.

4. The device in accordance with claim 3, wherein said plurality frequency deciders each update and store, in accordance with characteristics of the received signal, a program used to calculate the frequency of the sampling signal.

5. The device in accordance with claim 4, further comprising:

an error confirming circuit arranged in parallel to said sync word detector for comparing data relating to errors and generated when the data are present with, among the input data, data relating to errors to thereby confirm accurate receipt to output optimum phase information derived from error detection, and checking every packet for errors to thereby output number-of-error information reflecting a result of checking as the error presence/absence signal;

wherein said optimum phase detecting circuit is connected to generate, as an optimum clock, a frequency adjusted in accordance with the optimum frequency information determined by said sampling signal generator and a switch timing signal fed from an outside of said optimum phase detecting circuit, and feed the optimum clock to said sync word detector and said error confirming circuit, and wherein a timing controller is arranged outside of said optimum phase detecting circuit for generating the switch timing signal used to take in the clock frequency information.

6. The device in accordance with claim 5, wherein said switch timing signal is generated at a boundary between items included in the baseband signal, which is divided by a preselected cycle division, and subjects of detection of the optimum phase information.

7. The device in accordance with claim 3, further comprising:

an error confirming circuit arranged in parallel to said sync word detector and for comparing data relating to errors and generated when the data are present with, among the input data, data relating to errors to thereby confirm accurate receipt to output optimum phase information derived from error detection, and checking every packet for errors to output number-of-error information reflecting a result of checking as the error presence/absence signal;

wherein said optimum phase detecting circuit is connected to generate, as an optimum clock, a frequency adjusted in accordance with the optimum frequency information determined by said sampling signal generator and a switch timing signal fed from an outside of said optimum phase detecting circuit, and feed the optimum clock to said sync word detector and said error confirming circuit, and wherein a timing controller is arranged outside of said optimum phase detecting circuit for generating the switch timing signal used to take in the clock frequency information.

8. The device in accordance with claim 7, wherein said switch timing signal is generated at a boundary between items included in the baseband signal, which is divided by a preselected cycle division, and subjects of detection of the optimum phase information.

9. The device in accordance with claim 2, further comprising:

an error confirming circuit arranged in parallel to said sync word detector for comparing data relating to errors and generated when the data are present with, among the input data, data relating to errors to thereby confirm accurate receipt to output optimum phase information derived from error detection, and checking every packet for errors to output number-of error information reflecting a result of checking as the error presence/absence signal;

wherein said optimum phase detecting circuit is connected to generate, as an optimum clock, a frequency adjusted in accordance with the optimum frequency information determined by said sampling signal generator and a switch timing signal fed from an outside of said optimum phase detecting circuit, and feed the optimum clock to said sync word detector and said error confirming circuit, and wherein a timing controller is arranged outside of said optimum phase detecting circuit for generating the switch timing signal used to take in the clock frequency information.

10. The device in accordance with claim 9, wherein said switch tuning signal is generated at a boundary between items included in the baseband signal, which is divided by a preselected cycle division, and subjects of detection of the optimum phase information.

11. The device in accordance with claim 1, wherein said frequency determining circuit comprises:

a plurality frequency deciders each being assigned to a particular station to communicate for calculating a frequency of the sampling signal on the basis of the signal strength and the number-of-error information and determining whether or not the frequency calculated is optimum; and an output selector for selecting frequency information, which has the frequency determined to be optimum, in accordance with the link information and output the frequency information to said optimum phase detecting circuit.

12. The device in accordance with claim 11, wherein said plurality frequency deciders each update and store, in accordance with characteristics of the received signal, a program used to calculate the frequency of the sampling signal.

13. The device in accordance with claim 1, further comprising:

an error confirming circuit arranged in parallel to said sync word detector for comparing data relating to errors and generated when the data are present with, among the input data, data relating to errors to thereby confirm accurate receipt to output optimum phase information derived from error detection, and checking every packet for errors to output number-of-error information reflecting a result of checking as the error presence/absence signal;

wherein said optimum phase detecting circuit is connected to generate, as an optimum clock, a frequency adjusted in accordance with the optimum frequency information determined by said sampling signal generator and a switch timing signal fed from an outside of said optimum phase detecting circuit, and feed the optimum clock to said sync word detector and said error confirming circuit, and wherein a timing controller is arranged outside of said optimum phase detecting circuit for generating the switch timing signal used to take in the clock frequency information.

14. The device in accordance with claim 13, wherein said switch timing signal is generated at a boundary between items included in the baseband signal, which is divided by a preselected cycle division, and subjects of detection of the optimum phase information.

* * * * *